(12) United States Patent
Zhao

(10) Patent No.: US 12,568,365 B2
(45) Date of Patent: Mar. 3, 2026

(54) AUTHENTICATION EVENT PROCESSING METHOD, APPARATUS, AND SYSTEM

(71) Applicant: HUAWEI TECHNOLOGIES CO., LTD., Shenzhen (CN)

(72) Inventor: Xuwen Zhao, Shenzhen (CN)

(73) Assignee: Huawei Technologies Co., LTD., Shenzhen (CN)

( * ) Notice: Subject to any disclaimer, the term of this patent is extended or adjusted under 35 U.S.C. 154(b) by 148 days.

(21) Appl. No.: 17/969,165

(22) Filed: Oct. 19, 2022

(65) Prior Publication Data

US 2023/0048268 A1     Feb. 16, 2023

Related U.S. Application Data

(63) Continuation of application No. PCT/CN2021/077264, filed on Feb. 22, 2021.

(30) Foreign Application Priority Data

Apr. 20, 2020    (CN) .......................... 202010314067.8

(51) Int. Cl.
*H04W 12/06*        (2021.01)
*H04W 36/00*        (2009.01)

(52) U.S. Cl.
CPC ....... *H04W 12/06* (2013.01); *H04W 36/0038* (2013.01)

(58) Field of Classification Search
CPC .... H04W 12/06; H04W 36/0038; H04W 8/06
See application file for complete search history.

(56) References Cited

U.S. PATENT DOCUMENTS

2019/0174449 A1    6/2019  Shan et al.
2020/0337012 A1*  10/2020  Tiwari .................... H04W 4/12

FOREIGN PATENT DOCUMENTS

CN        101610554 A      12/2009
CN        101843126 A       9/2010
(Continued)

OTHER PUBLICATIONS

3GPP TS 23.501 V16.4.0, "3rd Generation Partnership Project; Technical Specification Group Services and System Aspects; System architecture for the 5G System (5GS); Stage 2 (Release 16)," Mar. 2020, 430 pages.
(Continued)

*Primary Examiner* — Joe Chacko
(74) *Attorney, Agent, or Firm* — Fish & Richardson P.C.

(57)        ABSTRACT

Embodiments of this application disclose example authentication event processing methods and apparatuses. One example method includes receiving, by a unified data management network element, a second authentication event processing request from an authentication server network element. The unified data management network element can then query an authentication event corresponding to the second information. The unified data management network element can then process the authentication event. The unified data management network element can then send a third authentication event processing request to a unified data repository network element. The unified data management network element can then receive a third authentication event processing response from the unified data repository network element. The unified data management network element can then send a second authentication event processing response to the authentication server network element.

20 Claims, 15 Drawing Sheets

(56) References Cited

FOREIGN PATENT DOCUMENTS

| | | |
|---|---|---|
| CN | 108023768 A | 5/2018 |
| CN | 110235458 A | 9/2019 |
| CN | 110366214 A | 10/2019 |
| CN | 110830422 A | 2/2020 |
| CN | 110913389 A | 3/2020 |
| WO | 2019076801 A1 | 4/2019 |
| WO | 2019204199 A1 | 10/2019 |

OTHER PUBLICATIONS

3GPP TS 29.503 V16.3.0, "3rd Generation Partnership Project; Technical Specification Group Core Network and Terminals; 5G System; Unified Data Management Services; Stage 3 (Release 16)," Mar. 2020, 319 pages.

3GPP TS 29.571 V16.3.0, "3rd Generation Partnership Project; Technical Specification Group Core Network and Terminals; 5G System; Common Data Types for Service Based Interfaces; Stage 3 (Release 16)," Mar. 2020, 100 pages.

3GPP TS 29.504 V16.3.0, "3rd Generation Partnership Project; Technical Specification Group Core Network and Terminals; 5G System; Unified Data Repository Services; Stage 3 (Release 16)," Mar. 2020, 38 pages.

3GPP TS 33.501 V16.2.0, "3rd Generation Partnership Project; Technical Specification Group Services and System Aspects; Security architecture and procedures for 5G system (Release 16)," Mar. 2020, 227 pages.

3GPP TS 29.505 V16.2.0, "3rd Generation Partnership Project; 5G System; Usage of the Unified Data Repository services for Subscription Data; Stage 3 (Release 16)," Mar. 2020, 141 pages.

3GPP TS 29.501 V16.3.0, "3rd Generation Partnership Project; Technical Specification Group Core Network and Terminals; 5G System; Principles and Guidelines for Services Definition; Stage 3 (Release 16)," Mar. 2020, 70 pages.

3GPP TS 29.500 V16.3.0, "3rd Generation Partnership Project; Technical Specification Group Core Network and Terminals; 5G System; Technical Realization of Service Based Architecture; Stage 3 (Release 16)," Mar. 2020, 65 pages.

Nokia et al., "AuthEvent deletion," 3GPP TSG-CT WG4 Meeting #96e, C4-201121, E-Meeting, Feb. 17-28, 2020, 10 pages.

Office Action in Chinese Appln. No. 202010314067.8, dated Mar. 15, 2022, 16 pages (with English translation).

International Search Report and Written Opinion in International Appln. No. PCT/CN2021/077264, mailed on May 26, 2021, 17 pages (with English translation).

Huawei et al., "Discussion on removing the authentication result in the UDM," 3GPP TSG-SA WG3 Meeting #95, S3-191417, Reno (US), May 6-10, 2019, 3 pages.

Huawei et al., "AUSF service update for the authentication result removal," 3GPP TSG-CT Meeting #87e, CP-200264, E-Meeting, Mar. 16-18, 2020, 9 pages.

Huawei, "AUSF service update for the authentication result removal," 3GPP TSG-CT WG4 Meeting #96e, C4-200837, E-Meeting, Feb. 17-28, 2020, 7 pages.

Extended European Search Report in European Appln No. 21791821.8, dated Jul. 27, 2023, 13 pages.

* cited by examiner

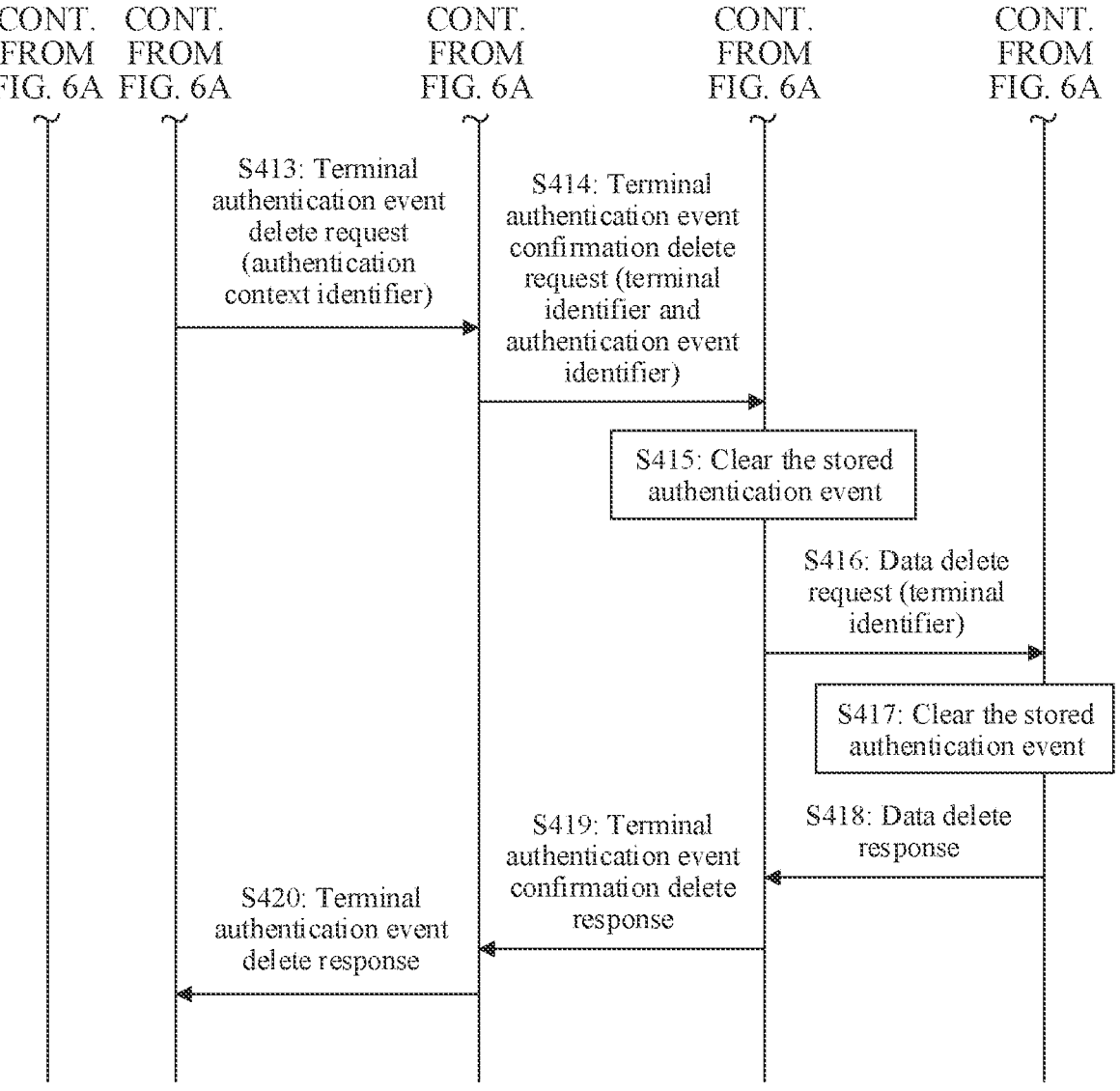

CONT.      CONT.                    CONT.                    CONT.                    CONT.
FROM      FROM                    FROM                    FROM                    FROM
FIG. 6A   FIG. 6A                 FIG. 6A                 FIG. 6A                 FIG. 6A

S413: Terminal
authentication event
delete request
(authentication
context identifier)

S414: Terminal
authentication event
confirmation delete
request (terminal
identifier and
authentication event
identifier)

S415: Clear the stored
authentication event

S416: Data delete
request (terminal
identifier)

S417: Clear the stored
authentication event

S418: Data delete
response

S419: Terminal
authentication event
confirmation delete
response

S420: Terminal
authentication event
delete response

FIG. 6B

AUTHENTICATION EVENT PROCESSING METHOD, APPARATUS, AND SYSTEM

CROSS-REFERENCE TO RELATED APPLICATIONS

This application is a continuation of International Application No. PCT/CN2021/077264, filed on Feb. 22, 2021, which claims priority to Chinese Patent Application No. 202010314067.8, filed on Apr. 20, 2020. The disclosures of the aforementioned applications are hereby incorporated by reference in their entireties.

TECHNICAL FIELD

This application relates to the field of communication technologies, and in particular, to an authentication event processing method, apparatus, and system.

BACKGROUND

FIG. 1 is a schematic flowchart of home control for authentication. A feature of increased home control is introduced into an authentication procedure of a $5^{th}$ generation ($5^{th}$ generation, 5G) communication system. To be specific, authentication performed by a network side on a terminal is determined by an authentication server function (authentication server function, AUSF) network element in a home network. After the authentication is completed, the AUSF sends an authentication event (AuthEvent) (also referred to as an authentication result (AuthResult) or an authentication status (AuthStatus)) to a unified data management (unified data management, UDM) network element, and the UDM stores the authentication event. After the authentication procedure, when a visited network invokes a service from the UDM in the home network, the UDM may authorize, based on the stored authentication event, the service invocation initiated by the visited network, to prevent the visited network from deceiving the home network.

Further, FIG. 2 is a schematic flowchart of sending, by the UDM, the authentication event to a unified data repository (unified data repository, UDR) network element. After the authentication succeeds, the UDM sends the authentication event to the UDR. The UDR stores the authentication event as the authentication status (AuthenticationStatus), and sends, to the UDM, a response indicating that the authentication event is stored.

After the authentication is completed, if a procedure such as non-access stratum (non-access stratum, NAS) security mode command (security mode command, SMC) rejection or terminal deregistration occurs, a mobility management network element notifies the AUSF to delete the authentication event, then the AUSF notifies the UDM to delete the authentication event, and the UDM notifies the UDR to delete the authentication event. However, if the terminal performs dual registration via two different serving networks (serving networks, SNs), terminal identifiers in two authentication events are the same. Because an authentication event or authentication status is associated with a terminal identifier, a problem that the UDR deletes the stored authentication status by mistake is caused. Once the authentication event is deleted by mistake, a serving network in which the authentication event is deleted cannot communicate with the home network normally, and this causes a communication exception.

SUMMARY

This application provides an authentication event processing method, apparatus, and system, to accurately delete an authentication event in a UDR, and prevent a communication exception caused by deleting the authentication event by mistake.

According to a first aspect, an authentication event processing method is provided, and includes: A unified data repository network element receives a third authentication event processing request from a unified data management network element, where the third authentication event processing request includes third information, and the third information includes one or more of the following information; a terminal identifier, a serving network name, a second authentication event identifier; the unified data repository network element queries an authentication event corresponding to the third information; the unified data repository network element processes the authentication event; and the unified data repository network element sends a third authentication event processing response to the unified data management network element. In this aspect, when the authentication event in the unified data repository network element needs to be deleted, the unified data repository network element deletes the authentication event associated with the serving network name, so that the unified data repository network element does not delete the authentication event by mistake in a scenario in which the terminal performs dual registration via two different serving networks, or the like. Therefore, the authentication event in the unified data repository network element can be accurately deleted, and a communication exception caused by deleting the authentication event by mistake is prevented.

In a possible implementation, that the unified data repository network element processes the authentication event includes any one of the following operations: deleting the authentication event; identifying the authentication event as invalid; updating the authentication event to failed. In this implementation, deleting the authentication event can save repository space of the unified data repository network element, and improve communication reliability. Identifying the authentication event as invalid or updating the authentication event to failed can improve communication reliability.

In another possible implementation, the method further includes: The unified data repository network element receives an authentication event repository request from the unified data management network element, where the authentication event repository request includes fourth information, and the fourth information includes one or more of the following information; the terminal identifier, the serving network name, the authentication event; the unified data repository network element correspondingly stores the one or more of the information in the fourth information; and the unified data repository network element sends an authentication event repository response to the unified data management network element.

In another possible implementation, the method further includes: The unified data repository network element generates the second authentication event identifier based on the terminal identifier and/or the serving network name; and the unified data repository network element correspondingly stores the second authentication event identifier and the authentication event, where the authentication event repository response includes the second authentication event identifier. In this implementation, the second authentication event identifier may be used to simplify a procedure between the unified data repository network element and the unified data management network element, and reduce signaling for transmission.

According to a second aspect, an authentication event processing method is provided, and includes: A unified data management network element receives a second authentication event processing request from an authentication server network element, where the second authentication event processing request includes second information, and the second information includes one or more of the following information: a terminal identifier, a serving network name, a first authentication event identifier; the unified data management network element queries an authentication event corresponding to the second information; the unified data management network element processes the authentication event; the unified data management network element sends a third authentication event processing request to a unified data repository network element, where the third authentication event processing request includes third information, and the third information includes one or more of the following information: the terminal identifier, the serving network name, a second authentication event identifier; the unified data management network element receives a third authentication event processing response from the unified data repository network element; and the unified data management network element sends a second authentication event processing response to the authentication server network element. In this aspect, after receiving the second authentication event processing request from the authentication server network element, the unified data management network element may request, based on the third information, the unified data repository network element to process the authentication event stored in the unified data repository network element, where the third information includes the serving network name. In this way, the unified data repository network element deletes the authentication event associated with the serving network name, so that the unified data repository network element does not delete the authentication event by mistake in a scenario in which the terminal performs dual registration via two different serving networks, or the like. Therefore, the authentication event in the unified data repository network element can be accurately deleted, and a communication exception caused by deleting the authentication event by mistake is prevented.

In a possible implementation, that the unified data management network element processes the authentication event includes any one of the following operations: deleting the authentication event; identifying the authentication event as invalid; updating the authentication event to failed. In this implementation, deleting the authentication event can save repository space of the unified data repository network element, and improve communication reliability. Identifying the authentication event as invalid or updating the authentication event to failed can improve communication reliability.

In another possible implementation, the method further includes: The unified data management network element sends an authentication event repository request to the unified data repository network element, where the authentication event repository request includes fourth information, and the fourth information includes one or more of the following information: the terminal identifier, the serving network name, the authentication event; and the unified data management network element receives an authentication event repository response from the unified data repository network element.

In another possible implementation, the authentication event repository response includes the first authentication event identifier. In this aspect, the first authentication event identifier is used to uniquely identify the authentication event, and may be used in an interaction procedure between the unified data management network element and the authentication server network element, to simplify the procedure and reduce signaling overheads.

In another possible implementation, the method further includes: The unified data management network element receives an authentication result confirmation request from the authentication server network element, where the authentication result confirmation request includes the terminal identifier and/or the authentication event, and the authentication event includes the serving network name; the unified data management network element generates the first authentication event identifier based on the terminal identifier and/or the serving network name; and the unified data management network element sends an authentication result confirmation response to the authentication server network element, where the authentication result confirmation response includes the first authentication event identifier.

According to a third aspect, an authentication event processing method is provided, and includes: An authentication server network element receives a first authentication event processing request from a mobility management network element, where the first authentication event processing request includes first information, and the first information includes one or more of the following information: a terminal identifier, a serving network name, an authentication context identifier; the authentication server network element queries a corresponding first authentication event identifier based on the first information; the authentication server network element sends a second authentication event processing request to a unified data management network element, where the second authentication event processing request includes second information, and the second information includes one or more of the following information: the terminal identifier, the serving network name, the first authentication event identifier; the authentication server network element receives a second authentication event processing response from the unified data management network element; and the authentication server network element sends a first authentication event processing response to the mobility management network element. In this aspect, when a non-access stratum security mode command failure, terminal deregistration, or the like occurs on a terminal, the authentication server network element may receive the authentication event processing request of the mobility management network element in time, and notify, in time, the unified data management network element to process an authentication event.

In a possible implementation, the method further includes: The authentication server network element sends an authentication result confirmation request to the unified data management network element, where the authentication result confirmation request includes the terminal identifier and/or an authentication event, and the authentication event includes the serving network name; and the authentication server network element receives an authentication result confirmation response from the unified data management network element, where the authentication result confirmation response includes the first authentication event identifier.

In another possible implementation, the method further includes: The authentication server network element generates an authentication context identifier based on the terminal identifier and/or the serving network name; and the authentication server network element sends the authentication context identifier to the mobility management network element.

According to a fourth aspect, an authentication event processing method is provided, and includes: A source mobility management network element detects that a terminal moves and registers with a target mobility management network element; the source mobility management network element sends a context communication service request to the target mobility management network element, where the context communication service request includes an authentication context identifier; and the source mobility management network element receives a context communication service response from the target mobility management network element. In this aspect, after detecting that the terminal moves and registers with the target mobility management network element, the source mobility management network element may send the authentication context identifier to the target mobility management network element, so that after terminal deregistration or a non-access stratum security mode command failure occurs, the target mobility management network element can trigger, in time, the authentication server network element to process an authentication event.

In a possible implementation, the method further includes: The source mobility management network element receives the authentication context identifier from an authentication server network element.

According to a fifth aspect, an authentication event processing method is provided, and includes: A target mobility management network element receives a context communication service request from a source mobility management network element, where the context communication service request includes an authentication context identifier; the target mobility management network element sends a context communication service response to the source mobility management network element; the target mobility management network element sends a first authentication event processing request to an authentication server network element, where the first authentication event processing request includes first information, and the first information includes one or more of the following information: a terminal identifier, a serving network name, the authentication context identifier; and the target mobility management network element receives a first authentication event processing response from the authentication server network element. In this aspect, after the source mobility management network element detects that the terminal moves and registers with the target mobility management network element, the target mobility management network element receives the authentication context identifier sent by the source mobility management network element, so that after terminal deregistration or a non-access stratum security mode command failure occurs, the target mobility management network element can trigger, in time, the authentication server network element to process an authentication event.

According to a sixth aspect, an authentication event processing method is provided, and includes: A mobility management network element sends a first authentication event processing request to an authentication server network element, where the first authentication event processing request includes first information, and the first information includes one or more of the following information: a terminal identifier, a serving network name, an authentication context identifier; the authentication server network element queries a corresponding first authentication event identifier based on the first information; the authentication server network element sends a second authentication event processing request to a unified data management network element, where the second authentication event processing request includes second information, and the second information includes one or more of the following information:

mation includes one or more of the following information: the terminal identifier, the serving network name, the first authentication event identifier; the unified data management network element queries an authentication event corresponding to the second information; the unified data management network element processes the authentication event; the unified data management network element sends a third authentication event processing request to a unified data repository network element, where the third authentication event processing request includes third information, and the third information includes one or more of the following information: the terminal identifier, the serving network name, a second authentication event identifier; the unified data repository network element queries an authentication event corresponding to the third information; the unified data repository network element processes the authentication event; the unified data repository network element sends a third authentication event processing response to the unified data management network element; the unified data management network element sends a second authentication event processing response to the authentication server network element; and the authentication server network element sends a first authentication event processing response to the mobility management network element.

The first authentication event identifier may be the same as the second authentication event identifier, or the second authentication event identifier is obtained by performing an operation on the first authentication event identifier. The unified data management network element stores a correspondence between the first authentication event identifier and the second authentication event identifier.

In a possible implementation, that the unified data management network element processes the authentication event or that the unified data repository network element processes the authentication event includes any one of the following operations: deleting the authentication event; identifying the authentication event as invalid; updating the authentication event to failed.

In another possible implementation, the mobility management network element is a target mobility management network element, and the method further includes: A source mobility management network element detects that a terminal moves and registers with the target mobility management network element; the source mobility management network element sends a context communication service request to the target mobility management network element, where the context communication service request includes an authentication context identifier; and the target mobility management network element sends a context communication service response to the source mobility management network element.

In another possible implementation, the method further includes: The authentication server network element generates an authentication context identifier based on the terminal identifier and/or the serving network name; and the authentication server network element sends the authentication context identifier to the mobility management network element.

In another possible implementation, the method further includes: The authentication server network element sends an authentication result confirmation request to the unified data management network element, where the authentication result confirmation request includes the terminal identifier and/or the authentication event, and the authentication event includes the serving network name; the unified data management network element generates the first authentication event identifier based on the terminal identifier and/or the serving network name; and the unified data management network element sends an authentication result confirmation response to the authentication server network element, where the authentication result confirmation response includes the first authentication event identifier.

In another possible implementation, the method further includes: The unified data management network element sends an authentication event repository request to the unified data repository network element, where the authentication event repository request includes fourth information, and the fourth information includes one or more of the following information: the terminal identifier, the serving network name, the authentication event; the unified data repository network element correspondingly stores the one or more of the information in the fourth information; and the unified data repository network element sends an authentication event repository response to the unified data management network element.

In another possible implementation, the method further includes: The unified data repository network element generates the second authentication event identifier based on the terminal identifier and/or the serving network name, and the unified data repository network element correspondingly stores the second authentication event identifier and the authentication event, where the authentication event repository response includes the second authentication event identifier.

According to a seventh aspect, a unified data repository network element is provided, and may implement the authentication event processing method in any one of the first aspect or the possible implementations of the first aspect. For example, the unified data repository network element may be a chip (for example, a communication chip) or a device. The foregoing method may be implemented by software, hardware, or hardware executing corresponding software.

The unified data repository network element includes a transceiver unit and a processing unit. The transceiver unit is configured to receive a third authentication event processing request from a unified data management network element, where the third authentication event processing request includes third information, and the third information includes one or more of the following information: a terminal identifier, a serving network name, a second authentication event identifier; and the processing unit is configured to query an authentication event corresponding to the third information. The processing unit is further configured to process the authentication event; and the transceiver unit is further configured to send a third authentication event processing response to the unified data management network element.

Optionally, the processing unit is configured to perform any one of the following operations: deleting the authentication event; identifying the authentication event as invalid; updating the authentication event to failed.

Optionally, the transceiver unit is further configured to receive an authentication event repository request from the unified data management network element, where the authentication event repository request includes fourth information, and the fourth information includes one or more of the following information: the terminal identifier, the serving network name, the authentication event; the processing unit is further configured to correspondingly store the one or more of the information in the fourth information; and the transceiver unit is further configured to send an authentication event repository response to the unified data management network element.

Optionally, the processing unit is further configured to generate the second authentication event identifier based on the terminal identifier and/or the serving network name; and the processing unit is further configured to correspondingly store the second authentication event identifier and the authentication event, where the authentication event repository response includes the second authentication event identifier.

In another possible implementation, the unified data repository network element includes an input interface, an output interface, and a processing circuit. The input interface is configured to obtain a third authentication event processing request from a unified data management network element, where the third authentication event processing request includes third information, and the third information includes one or more of the following information: a terminal identifier, a serving network name, a second authentication event identifier; and the processing circuit is configured to query an authentication event corresponding to the third information. The processing circuit is further configured to process the authentication event; and the output interface is configured to output a third authentication event processing response to the unified data management network element.

Optionally, the processing circuit is configured to perform any one of the following operations: deleting the authentication event; identifying the authentication event as invalid; updating the authentication event to failed.

Optionally, the input interface is further configured to obtain an authentication event repository request from the unified data management network element, where the authentication event repository request includes fourth information, and the fourth information includes one or more of the following information: the terminal identifier, the serving network name, the authentication event; the processing circuit is further configured to correspondingly store the one or more of the information in the fourth information; and the output interface is further configured to output an authentication event repository response to the unified data management network element.

Optionally, the processing circuit is further configured to generate the second authentication event identifier based on the terminal identifier and/or the serving network name; and the processing circuit is further configured to correspondingly store the second authentication event identifier and the authentication event, where the authentication event repository response includes the second authentication event identifier.

In another possible implementation, the unified data repository network element includes a processor, and the processor is used in the authentication event processing method in any one of the first aspect or the possible implementations of the first aspect.

In another possible implementation, the unified data repository network element includes a processor, configured to execute a program stored in a memory; and when the program is executed, the unified data repository network element is enabled to perform the authentication event processing method in any one of the first aspect or the possible implementations of the first aspect.

For example, the unified data repository network element further includes a memory, and the memory is coupled to the at least one processor.

For example, the memory is located outside the unified data repository network element.

For example, the unified data repository network element further includes a communication interface, and the communication interface is used by the unified data repository network element to communicate with another device. The communication interface may be a transceiver, an input/output interface, a circuit, or the like.

In another possible implementation, the unified data repository network element includes a processor, a memory, and a computer program that is stored in the memory and that can be run on the processor; and when the computer program is run, the unified data repository network element is enabled to perform the authentication event processing method in any one of the first aspect or the possible implementations of the first aspect.

For technical effects achieved in any implementation of the seventh aspect, refer to technical effects achieved in different implementations of the first aspect. Details are not described herein again.

According to an eighth aspect, a unified data management network element is provided, and may implement the authentication event processing method in any one of the second aspect or the possible implementations of the second aspect. For example, the unified data management network element may be a chip (for example, a communication chip) or a device. The foregoing method may be implemented by software, hardware, or hardware executing corresponding software.

The unified data management network element includes a transceiver unit and a processing unit. The transceiver unit is configured to receive a second authentication event processing request from an authentication server network element, where the second authentication event processing request includes second information, and the second information includes one or more of the following information: a terminal identifier, a serving network name, a first authentication event identifier; and the processing unit is configured to query an authentication event corresponding to the second information. The processing unit is further configured to process the authentication event; the transceiver unit is further configured to send a third authentication event processing request to a unified data repository network element, where the third authentication event processing request includes third information, and the third information includes one or more of the following information: the terminal identifier, the serving network name, a second authentication event identifier; the transceiver unit is further configured to receive a third authentication event processing response from the unified data repository network element; and the transceiver unit is further configured to send a second authentication event processing response to the authentication server network element.

Optionally, the processing unit is configured to perform any one of the following operations: deleting the authentication event; identifying the authentication event as invalid; updating the authentication event to failed.

Optionally, the transceiver unit is further configured to send an authentication event repository request to the unified data repository network element, where the authentication event repository request includes fourth information, and the fourth information includes one or more of the following information: the terminal identifier, the serving network name, the authentication event, and the transceiver unit is further configured to receive an authentication event repository response from the unified data repository network element.

Optionally, the authentication event repository response includes the first authentication event identifier.

Optionally, the transceiver unit is further configured to receive an authentication result confirmation request from the authentication server network element, where the authentication result confirmation request includes the terminal identifier and/or the authentication event, and the authentication event includes the serving network name; the processing unit is further configured to generate the first authentication event identifier based on the terminal identifier and/or the serving network name; and the transceiver unit is further configured to send an authentication result confirmation response to the authentication server network element, where the authentication result confirmation response includes the first authentication event identifier.

In another possible implementation, the unified data management network element includes an input interface, an output interface, and a processing circuit. The input interface is configured to obtain a second authentication event processing request from an authentication server network element, where the second authentication event processing request includes second information, and the second information includes one or more of the following information: a terminal identifier, a serving network name, a first authentication event identifier; and the processing circuit is configured to query an authentication event corresponding to the second information. The processing circuit is further configured to process the authentication event; the output interface is further configured to output a third authentication event processing request to a unified data repository network element, where the third authentication event processing request includes third information, and the third information includes one or more of the following information: the terminal identifier, the serving network name, a second authentication event identifier; the input interface is further configured to obtain a third authentication event processing response from the unified data repository network element; and the output interface is further configured to output a second authentication event processing response to the authentication server network element.

Optionally, the processing circuit is configured to perform any one of the following operations: deleting the authentication event; identifying the authentication event as invalid; updating the authentication event to failed.

Optionally, the output interface is further configured to output an authentication event repository request to the unified data repository network element, where the authentication event repository request includes fourth information, and the fourth information includes one or more of the following information: the terminal identifier, the serving network name, the authentication event; and the input interface is further configured to obtain an authentication event repository response from the unified data repository network element.

Optionally, the authentication event repository response includes the first authentication event identifier.

Optionally, the input interface is further configured to obtain an authentication result confirmation request from the authentication server network element, where the authentication result confirmation request includes the terminal identifier and/or the authentication event, and the authentication event includes the serving network name; the processing circuit is further configured to generate the first authentication event identifier based on the terminal identifier and/or the serving network name; and the output interface is further configured to output an authentication result confirmation response to the authentication server network element, where the authentication result confirmation response includes the first authentication event identifier.

In another possible implementation, the unified data management network element includes a processor, and the processor is used in the authentication event processing method in any one of the second aspect or the possible implementations of the second aspect.

In another possible implementation, the unified data management network element includes a processor, configured to execute a program stored in a memory; and when the program is executed, the unified data management network element is enabled to perform the authentication event processing method in any one of the second aspect or the possible implementations of the second aspect.

For example, the unified data management network element further includes a memory, and the memory is coupled to the at least one processor.

For example, the memory is located outside the unified data management network element.

For example, the unified data management network element further includes a communication interface, and the communication interface is used by the unified data management network element to communicate with another device. The communication interface may be a transceiver, an input/output interface, a circuit, or the like.

In another possible implementation, the unified data management network element includes a processor, a memory, and a computer program that is stored in the memory and that can be run on the processor; and when the computer program is run, the unified data management network element is enabled to perform the authentication event processing method in any one of the second aspect or the possible implementations of the second aspect.

For technical effects achieved in any implementation of the eighth aspect, refer to technical effects achieved in different implementations of the second aspect. Details are not described herein again.

According to a ninth aspect, an authentication server network element is provided, and may implement the authentication event processing method in any one of the third aspect or the possible implementations of the third aspect. For example, the authentication server network element may be a chip (for example, a communication chip) or a device. The foregoing method may be implemented by software, hardware, or hardware executing corresponding software.

The authentication server network element includes a transceiver unit and a processing unit. The transceiver unit is configured to receive a first authentication event processing request from a mobility management network element, where the first authentication event processing request includes first information, and the first information includes one or more of the following information: a terminal identifier, a serving network name, an authentication context identifier; and the processing unit is configured to query a corresponding first authentication event identifier based on the first information. The transceiver unit is further configured to send a second authentication event processing request to a unified data management network element, where the second authentication event processing request includes second information, and the second information includes one or more of the following information: the terminal identifier, the serving network name, the first authentication event identifier; the transceiver unit is further configured to receive a second authentication event processing response from the unified data management network element; and the transceiver unit is further configured to send a first authentication event processing response to the mobility management network element.

Optionally, the transceiver unit is further configured to send an authentication result confirmation request to the unified data management network element, where the authentication result confirmation request includes the terminal identifier and/or an authentication event, and the authentication event includes the serving network name; and the transceiver unit is further configured to receive an authentication result confirmation response from the unified data management network element, where the authentication result confirmation response includes the first authentication event identifier.

Optionally, the processing unit is further configured to generate an authentication context identifier based on the terminal identifier and/or the serving network name; and the transceiver unit is further configured to send the authentication context identifier to the mobility management network element.

In another possible implementation, the authentication server network element includes an input interface, an output interface, and a processing circuit. The input interface is configured to input a first authentication event processing request from a mobility management network element, where the first authentication event processing request includes first information, and the first information includes one or more of the following information: a terminal identifier, a serving network name, an authentication context identifier; and the processing circuit is configured to query a corresponding first authentication event identifier based on the first information. The output interface is further configured to output a second authentication event processing request to a unified data management network element, where the second authentication event processing request includes second information, and the second information includes one or more of the following information: the terminal identifier, the serving network name, the first authentication event identifier; the input interface is further configured to input a second authentication event processing response from the unified data management network element; and the output interface is further configured to output a first authentication event processing response to the mobility management network element.

Optionally, the output interface is further configured to output an authentication result confirmation request to the unified data management network element, where the authentication result confirmation request includes the terminal identifier and/or an authentication event, and the authentication event includes the serving network name; and the input interface is further configured to input an authentication result confirmation response from the unified data management network element, where the authentication result confirmation response includes the first authentication event identifier.

Optionally, the processing circuit is further configured to generate an authentication context identifier based on the terminal identifier and/or the serving network name; and the output interface is further configured to output the authentication context identifier to the mobility management network element.

In another possible implementation, the authentication server network element includes a processor, and the processor is used in the authentication event processing method in any one of the third aspect or the possible implementations of the third aspect.

In another possible implementation, the authentication server network element includes a processor, configured to execute a program stored in a memory; and when the program is executed, the authentication server network element is enabled to perform the authentication event processing method in any one of the third aspect or the possible implementations of the third aspect.

For example, the authentication server network element further includes a memory, and the memory is coupled to the at least one processor.

For example, the memory is located outside the authentication server network element.

For example, the authentication server network element further includes a communication interface, and the communication interface is used by the authentication server network element to communicate with another device. The communication interface may be a transceiver, an input/output interface, a circuit, or the like.

In another possible implementation, the authentication server network element includes a processor, a memory, and a computer program that is stored in the memory and that can be run on the processor; and when the computer program is run, the authentication server network element is enabled to perform the authentication event processing method in any one of the third aspect or the possible implementations of the third aspect.

For technical effects achieved in any implementation of the ninth aspect, refer to technical effects achieved in different implementations of the third aspect. Details are not described herein again.

According to a tenth aspect, a source mobility management network element is provided, and may implement the authentication event processing method in any one of the fourth aspect or the possible implementations of the fourth aspect. For example, the source mobility management network element may be a chip (for example, a communication chip) or a device. The foregoing method may be implemented by software, hardware, or hardware executing corresponding software.

The source mobility management network element includes a processing unit and a transceiver unit. The processing unit is configured to detect that a terminal moves and registers with a target mobility management network element; and the transceiver unit is configured to send a context communication service request to the target mobility management network element, where the context communication service request includes an authentication context identifier. The transceiver unit is further configured to receive a context communication service response from the target mobility management network element.

Optionally, the transceiver unit is further configured to receive the authentication context identifier from an authentication server network element.

In another possible implementation, the source mobility management network element includes an input interface, an output interface, and a processing circuit. The processing circuit is configured to detect that a terminal moves and registers with a target mobility management network element; and the output interface is configured to output a context communication service request to the target mobility management network element, where the context communication service request includes an authentication context identifier. The input interface is further configured to obtain a context communication service response from the target mobility management network element.

Optionally, the input interface is further configured to obtain the authentication context identifier from an authentication server network element.

In another possible implementation, the source mobility management network element includes a processor, and the processor is used in the authentication event processing method in any one of the fourth aspect or the possible implementations of the fourth aspect.

In another possible implementation, the source mobility management network element includes a processor, configured to execute a program stored in a memory; and when the program is executed, the source mobility management network element is enabled to perform the authentication event processing method in any one of the fourth aspect or the possible implementations of the fourth aspect.

For example, the source mobility management network element further includes a memory, and the memory is coupled to the at least one processor.

For example, the memory is located outside the source mobility management network element.

For example, the source mobility management network element further includes a communication interface, and the communication interface is used by the source mobility management network element to communicate with another device. The communication interface may be a transceiver, an input/output interface, a circuit, or the like.

In another possible implementation, the source mobility management network element includes a processor, a memory, and a computer program that is stored in the memory and that can be run on the processor; and when the computer program is run, the source mobility management network element is enabled to perform the authentication event processing method in any one of the fourth aspect or the possible implementations of the fourth aspect.

For technical effects achieved in any implementation of the tenth aspect, refer to technical effects achieved in different implementations of the fourth aspect. Details are not described herein again.

According to an eleventh aspect, a target mobility management network element is provided, and may implement the authentication event processing method in any one of the fifth aspect or the possible implementations of the fifth aspect. For example, the target mobility management network element may be a chip (for example, a communication chip) or a device. The foregoing method may be implemented by software, hardware, or hardware executing corresponding software.

The target mobility management network element includes a transceiver unit. The transceiver unit is configured to receive a context communication service request from a source mobility management network element, where the context communication service request includes an authentication context identifier. The transceiver unit is further configured to send a context communication service response to the source mobility management network element; the transceiver unit is further configured to send a first authentication event processing request to an authentication server network element, where the first authentication event processing request includes first information, and the first information includes one or more of the following information: a terminal identifier, a serving network name, the authentication context identifier; and the transceiver unit is further configured to receive a first authentication event processing response from the authentication server network element.

In another possible implementation, the target mobility management network element includes an input interface, an output interface, and a processing circuit. The input interface is configured to obtain a context communication service request from a source mobility management network element, where the context communication service request includes an authentication context identifier. The output interface is further configured to output a context communication service response to the source mobility management network element; the output interface is further configured to output a first authentication event processing request to an authentication server network element, where the first authentication event processing request includes first information, and the first information includes one or more of the following information: a terminal identifier, a serving network name, the authentication context identifier; and the input interface is further configured to obtain a first authentication event processing response from the authentication server network element.

In another possible implementation, the target mobility management network element includes a processor, and the processor is used in the authentication event processing method in any one of the fifth aspect or the possible implementations of the fifth aspect.

In another possible implementation, the target mobility management network element includes a processor, configured to execute a program stored in a memory; and when the program is executed, the target mobility management network element is enabled to perform the authentication event processing method in any one of the fifth aspect or the possible implementations of the fifth aspect.

For example, the target mobility management network element further includes a memory, and the memory is coupled to the at least one processor.

For example, the memory is located outside the target mobility management network element.

For example, the target mobility management network element further includes a communication interface, and the communication interface is used by the target mobility management network element to communicate with another device. The communication interface may be a transceiver, an input/output interface, a circuit, or the like.

In another possible implementation, the target mobility management network element includes a processor, a memory, and a computer program that is stored in the memory and that can be run on the processor; and when the computer program is run, the target mobility management network element is enabled to perform the authentication event processing method in any one of the fifth aspect or the possible implementations of the fifth aspect.

For technical effects achieved in any implementation of the eleventh aspect, refer to technical effects achieved in different implementations of the fifth aspect. Details are not described herein again.

According to a twelfth aspect, an authentication event processing system is provided, and includes the authentication event processing apparatuses in the foregoing seventh aspect to the eleventh aspect.

According to a thirteenth aspect, a computer-readable storage medium is provided. The computer-readable storage medium stores a computer program; and when the computer program is run on a computer, the method according to any one of the foregoing aspect or the implementations of the aspect is performed.

According to a fourteenth aspect, a computer program product is provided. When the computer program product runs on a computer, the method according to any one of the foregoing aspect or the implementations of the aspect is performed.

According to a fifteenth aspect, a computer program is provided. When the computer program is run on a computer, the method according to any one of the foregoing aspect or the implementations of the aspect is performed.

BRIEF DESCRIPTION OF DRAWINGS

FIG. 6A and FIG. 6B are another schematic flowchart of an authentication event processing method according to an embodiment of this application;

DESCRIPTION OF EMBODIMENTS

Technical solutions in embodiments of this application may be applied to various communication systems, for example, a $5^{th}$ generation ($5^{th}$ generation, 5G) system or a new radio (new radio, NR). A 5G mobile communication system in this application includes a non-standalone (non-standalone, NSA) 5G mobile communication system or a standalone (standalone, SA) 5G mobile communication system. The technical solutions provided in this application may further be applied to a future communication system, for example, a $6^{th}$ generation mobile communication system. Alternatively, the communication system may be a public land mobile network (public land mobile network, PLMN), a device-to-device (device-to-device. D2D) communication system, a machine to machine (machine to machine, M2M) communication system, an internet of things (internet of things, IoT) communication system, or another communication system.

Figure 1:
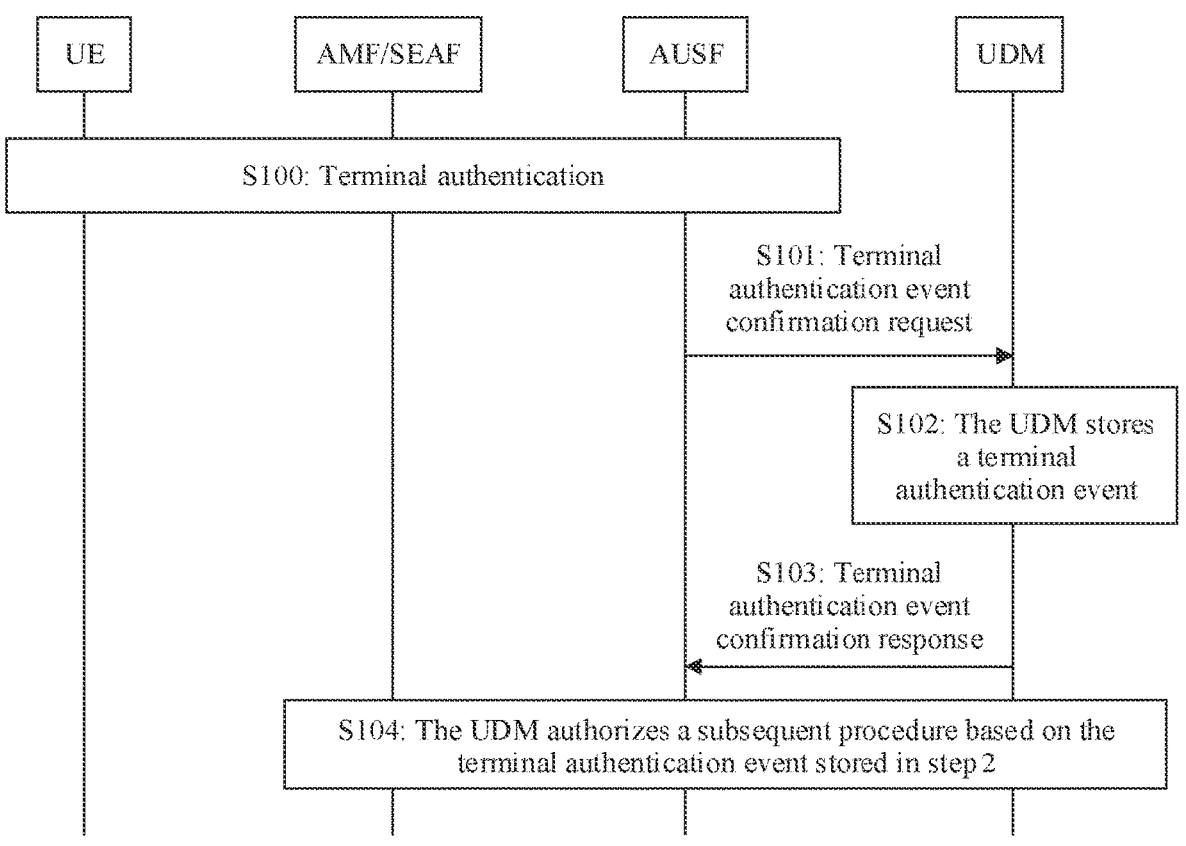
FIG. 1 is a schematic flowchart of home control for authentication.
Figure 2:
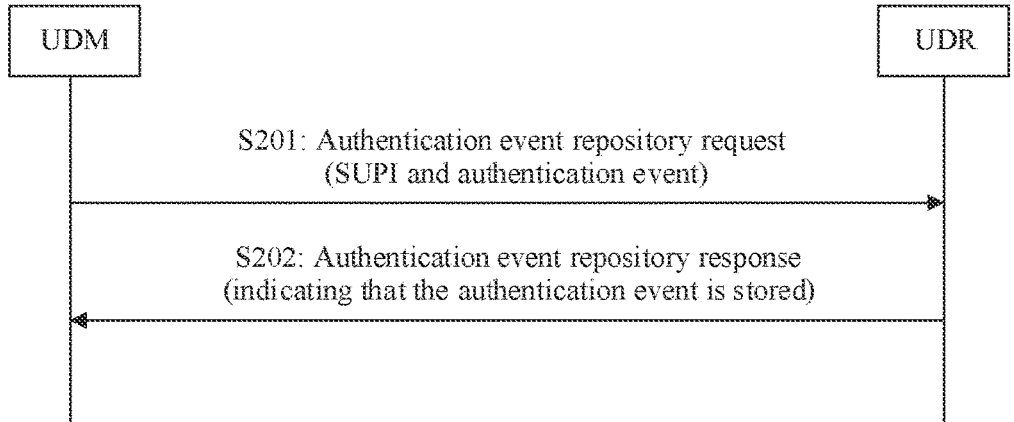
FIG. 2 is a schematic flowchart of sending an authentication event by a UDM to a UDR.
Figures 3, 4:
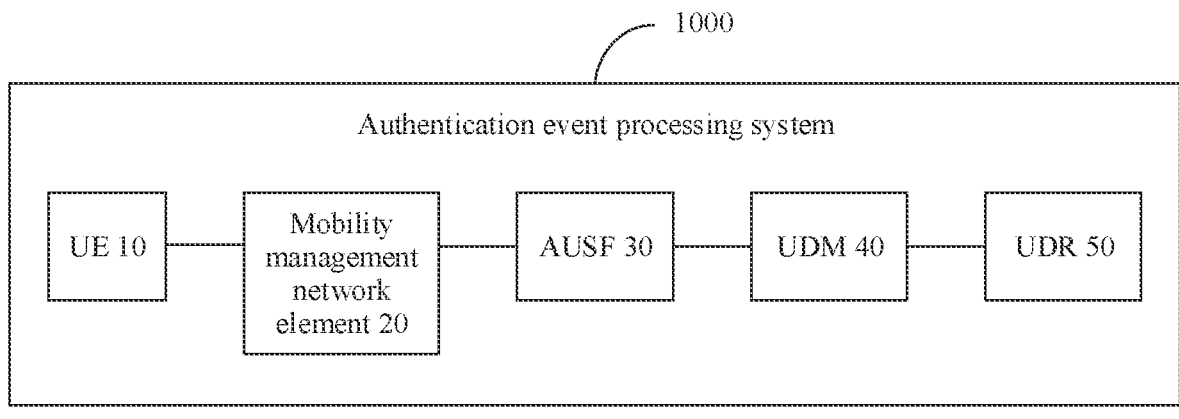
FIG. 3 is a schematic architectural diagram of an authentication event processing system to which an authentication event processing method according to an embodiment of this application is applied.
FIG. 4 is a schematic diagram of a non-roaming architecture based on a service-oriented interface in a $5^{th}$ generation mobile communication network.

FIG. 3 is a schematic architectural diagram of an authentication event processing system to which an authentication event processing method according to an embodiment of this application is applied. As shown in FIG. 3, the system 1000 includes a terminal 10, a mobility management network element 20, an AUSF 30, a UDM 40, and a UDR 50. The terminal 10, the mobility management network element 20, the AUSF 30, the UDM 40, and the UDR 50 may communicate with each other. A network element or an entity corresponding to the mobility management network element may be an access and mobility management function (access and mobility management function, AMF) entity in a 5G mobile communication system, or the like. This is not specifically limited in this embodiment of this application. Although not shown, the system may further include another network element. This is not specifically limited in this embodiment of this application.

Specifically, a non-roaming architecture based on a service-oriented interface in a $5^{th}$ generation mobile communication network shown in FIG. 4 is used as an example. The system mainly includes a terminal, an AMF, an AUSF, a UDM, and a UDR. In FIG. 4, the system is based on the service-oriented interface, and a message sent by a function network element to another function network element needs to carry an identifier of the another function network element.

Functions of function network elements in FIG. 4 are as follows.

The AMF is mainly responsible for signaling processing, for example, functions such as access control, mobility management, attachment and detachment, and gateway selection.

The AUSF is mainly responsible for authenticating the terminal.

The UDR is mainly responsible for storing structured data, and stored content includes subscription data and policy data, externally exposed structured data, and application-related data.

The UDM is mainly configured to manage user subscription information.

It should be noted that the foregoing function entity is only a name, and the name does not constitute a limitation on the entity. For example, the mobility management function entity may also be replaced with a "mobility management function" or another name. In addition, the mobility management function entity may also correspond to an entity that includes another function in addition to a mobility management function. The unified data repository function entity may also be replaced with a "unified data repository function" or another name. This is uniformly described herein, and details are not described below again.

The terminal accesses a network through a radio access network (radio access network, RAN) device or an access network (access network, AN) device. The RAN device is mainly a wireless network device in a 3GPP network, and the AN device may be an access network device defined in non-3GPP.

Optionally, the terminal in embodiments of this application may be an access terminal, a subscriber unit, a subscriber station, a mobile station, a relay station, a remote station, a remote terminal, a mobile device, a user terminal (user terminal), user equipment (user equipment, UE), a terminal, a wireless communication device, a user agent, a user apparatus, a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another processing device connected to a wireless modem, a vehicle-mounted device, a wearable device, a terminal in a future 5G network, a terminal in a future evolved public land mobile network (public land mobile network, PLMN), a terminal in a future internet of vehicles, or the like. This is not limited in embodiments of this application.

By way of example but not limitation, in embodiments of this application, the terminal may be a mobile phone, a tablet computer, a computer having a wireless transceiver function, a virtual reality terminal, an augmented reality terminal, a wireless terminal in industrial control, a wireless terminal in self driving, a wireless terminal in remote surgery, a wireless terminal in a smart grid, a wireless terminal in transportation safety, a wireless terminal in a smart city, a wireless terminal in a smart home, or the like.

By way of example but not limitation, in embodiments of this application, the wearable device may also be referred to as a wearable intelligent device, and is a generic term for wearable devices such as glasses, gloves, watches, clothes, and shoes that are developed based on intelligent design of daily wearing by using wearable technologies. The wearable device is a portable device that is directly worn on a body or integrated into clothes or an accessory of a user. The wearable device is more than a hardware device, and implements powerful functions through software support, data exchange, and cloud interaction. Generalized wearable intelligent devices include full-featured and large-size devices that can implement complete or partial functions without depending on smartphones, such as smart watches or smart glasses, and devices that focus on only one type of application and need to work with other devices such as smartphones, such as various smart bands or smart jewelry for monitoring physical signs.

In addition, in embodiments of this application, the terminal may alternatively be a terminal in an IoT system. IoT is an important part of future development of information technologies. A main technical feature of the IoT is connecting a thing to a network by using a communication technology, to implement an intelligent network for interconnection between a person and a machine or between things. In embodiments of this application, an IoT technology may implement massive connections, deep coverage, and terminal power saving by using, for example, a narrowband (narrowband, NB) technology.

In addition, in embodiments of this application, the terminal may alternatively include a sensor such as an intelligent printer, a train detector, or a gas station, and main functions of the terminal include: collecting data (for some terminals), receiving control information and downlink data from the access network device, sending an electromagnetic wave, and transmitting uplink data to the access network device.

Optionally, the access network device in embodiments of this application may be any communication device that has a wireless transceiver function and that is configured to communicate with the terminal. The access network device includes but is not limited to an evolved NodeB (evolved NodeB, eNB), a baseband unit (baseband unit, BBU), an access point (access point, AP) in a wireless fidelity (wireless fidelity, Wi-Fi) system, a wireless relay node, a wireless backhaul node, a transmission point (transmission point, TP), a TRP, or the like. Alternatively, the access network device may be a gNB, a TRP, or a TP in the 5G system, or may be an antenna panel or a group of (including a plurality of antenna panels) antenna panels of a base station in the 5G system. In addition, the access network device may alternatively be a network node included in the gNB or the TP, for example, a BBU or a distributed unit (distributed unit, DU).

In some deployments, the gNB may include a centralized unit (centralized unit, CU) and the DU. In addition, the gNB may further include an active antenna unit (active antenna unit, AAU). The CU implements some functions of the gNB, and the DU implements some functions of the gNB. For example, the CU is responsible for processing a non-real-time protocol and service, and implements functions of a radio resource control (radio resource control, RRC) layer and a packet data convergence protocol (packet data convergence protocol, PDCP) layer. The DU is responsible for processing a physical layer protocol and a real-time service, and implements functions of a radio link control (radio link control, RLC) layer, a media access control (media access control, MAC) layer, and a physical (physical, PHY) layer. The AAU implements some physical layer processing functions, radio frequency processing, and a function related to an active antenna. Information at the RRC layer eventually becomes information at the PHY layer, or is changed from information at the PHY layer. Therefore, in this architecture, higher-layer signaling such as RRC layer signaling may also be considered as being sent by the DU or sent by the DU and the AAU. It may be understood that the access network device may be a device including one or more of a CU node, a DU node, an AAU node.

Optionally, the access network device and the terminal in embodiments of this application may communicate with each other by using a licensed spectrum, may communicate with each other by using an unlicensed spectrum, or may communicate with each other by using both the licensed spectrum and the unlicensed spectrum. The access network device and the terminal may communicate with each other by using a spectrum below 6 gigahertz (gigahertz, GHz), may communicate with each other by using a spectrum above 6 GHz, or may communicate with each other by using both the spectrum below 6 GHz and the spectrum above 6 GHz. A spectrum resource used between the access network device and the terminal is not limited in embodiments of this application.

Optionally, the terminal and the access network device in embodiments of this application may be deployed on land, including indoor, outdoor, handheld, or vehicle-mounted devices; may be deployed on the water; or may be deployed on airplanes, balloons and satellites in the air. Application scenarios of the terminal and the access network device are not limited in embodiments of this application.

Optionally, in embodiments of this application, the terminal or each network element includes a hardware layer, an operating system layer running on the hardware layer, and an application layer running on the operating system layer. The hardware layer includes hardware such as a central processing unit (central processing unit, CPU), a memory management unit (memory management unit, MMU), and a memory (also referred to as a main memory). The operating system may be any one or more computer operating systems, for example, a Linux operating system, a Unix operating system, an Android operating system, an iOS operating system, or a Windows operating system, that implement service processing by using a process (process). The application layer includes applications such as a browser, an address book, word processing software, and instant messaging software. In addition, a specific structure of an execution body of a method provided in embodiments of this application is not specifically limited in embodiments of this application, provided that a program that records code of the method provided in embodiments of this application can be run to perform communication according to the method provided in embodiments of this application. For example, the method provided in embodiments of this application may be performed by the terminal, the AMF, the AUSF, the UDM, or the UDR, or a function module that can invoke and execute the program in the terminal, the AMF, the AUSF, the UDM, or the UDR.

In other words, a related function of the terminal, the AMF, the AUSF, the UDM, or the UDR in embodiments of this application may be implemented by one device, may be jointly implemented by a plurality of devices, or may be implemented by one or more function modules in one device. This is not specifically limited in embodiments of this application. It may be understood that the foregoing function may be a network element in a hardware device, may be a software function running on dedicated hardware, a combination of hardware and software, or a virtualization function instantiated on a platform (for example, a cloud platform).

Figure 5:
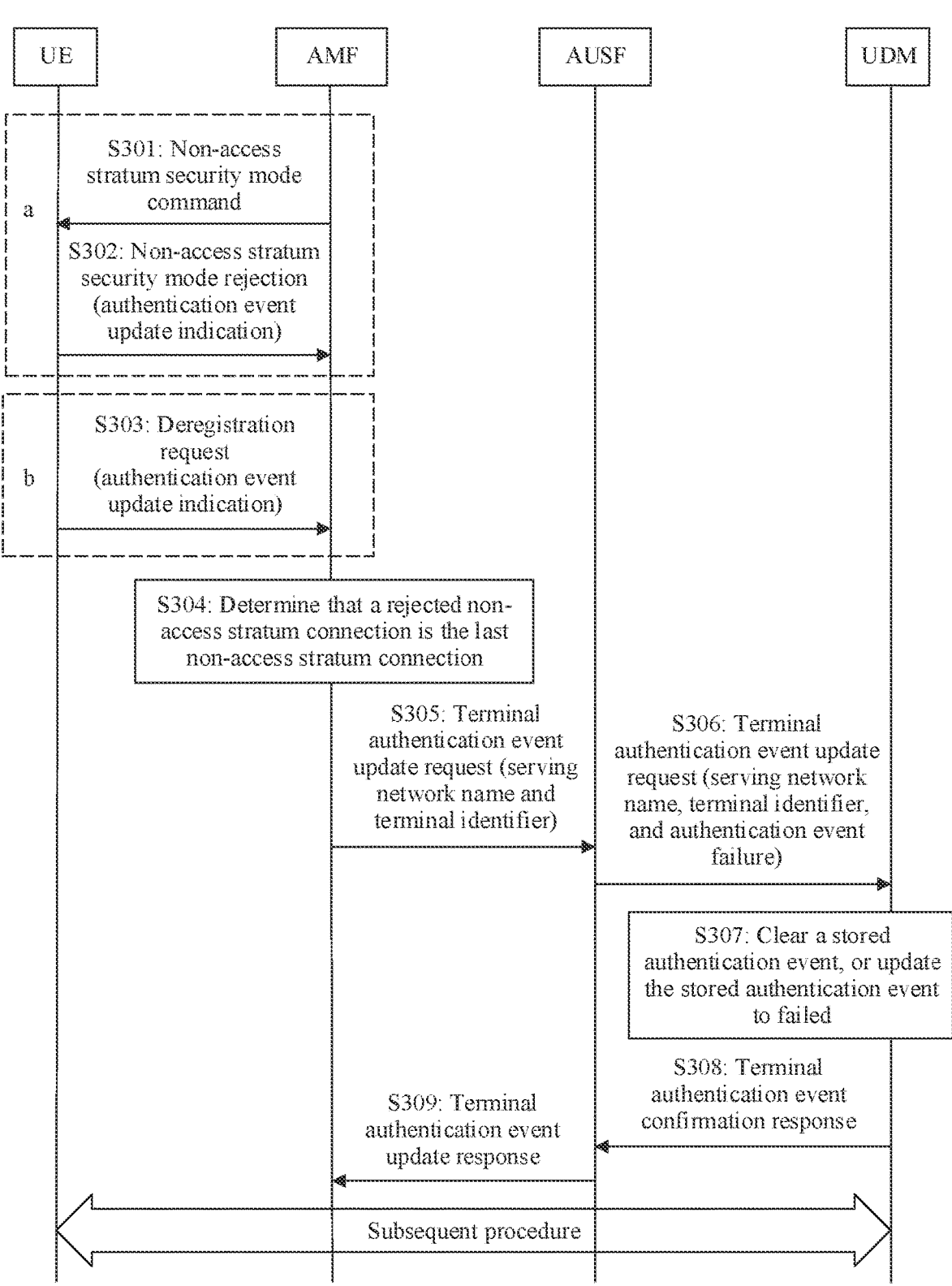
FIG. 5 is a schematic flowchart of an authentication event processing method according to an embodiment of this application.

FIG. 5 is a schematic flowchart of an authentication event processing method according to an embodiment of this application. When a NAS SMC failure (steps S301 and S302) or terminal deregistration (step S303) occurs, in step S305, an AMF invokes a new service or an existing service of an AUSF, and sends an authentication event update request ($N_{ausf}$_UEAuthentication_Event Update Request) to the AUSF, to notify the AUSF to delete an authentication event. The service request includes a serving network name (serving network name) and a terminal identifier (for example, a subscription permanent identifier (subscription permanent identifier, SUPI) or a subscription concealed identifier (subscription concealed identifier, SUCI)), and/or indication information indicating to delete the authentication event. In step S306, the AUSF invokes a new service or an existing service of a UDM, and sends an authentication event confirmation request ($N_{udm}$_UEAuthentication_Event Confirmation Request) to the UDM, to notify the UDM to delete the authentication event. The service request includes the serving network name and the terminal identifier, and/or the indication information indicating to delete the authentication event. Finally, in step S307, based on the serving network name and the terminal identifier, and/or the indication information, the UDM deletes the stored authentication event, or updates the stored authentication event to failed or invalid.

However, an authentication event processing procedure between the UDM and a UDR is not involved in the foregoing embodiment. If the authentication event in the UDR is not deleted, the UDM may still obtain the authentication event from the UDR.

Figure 6A:
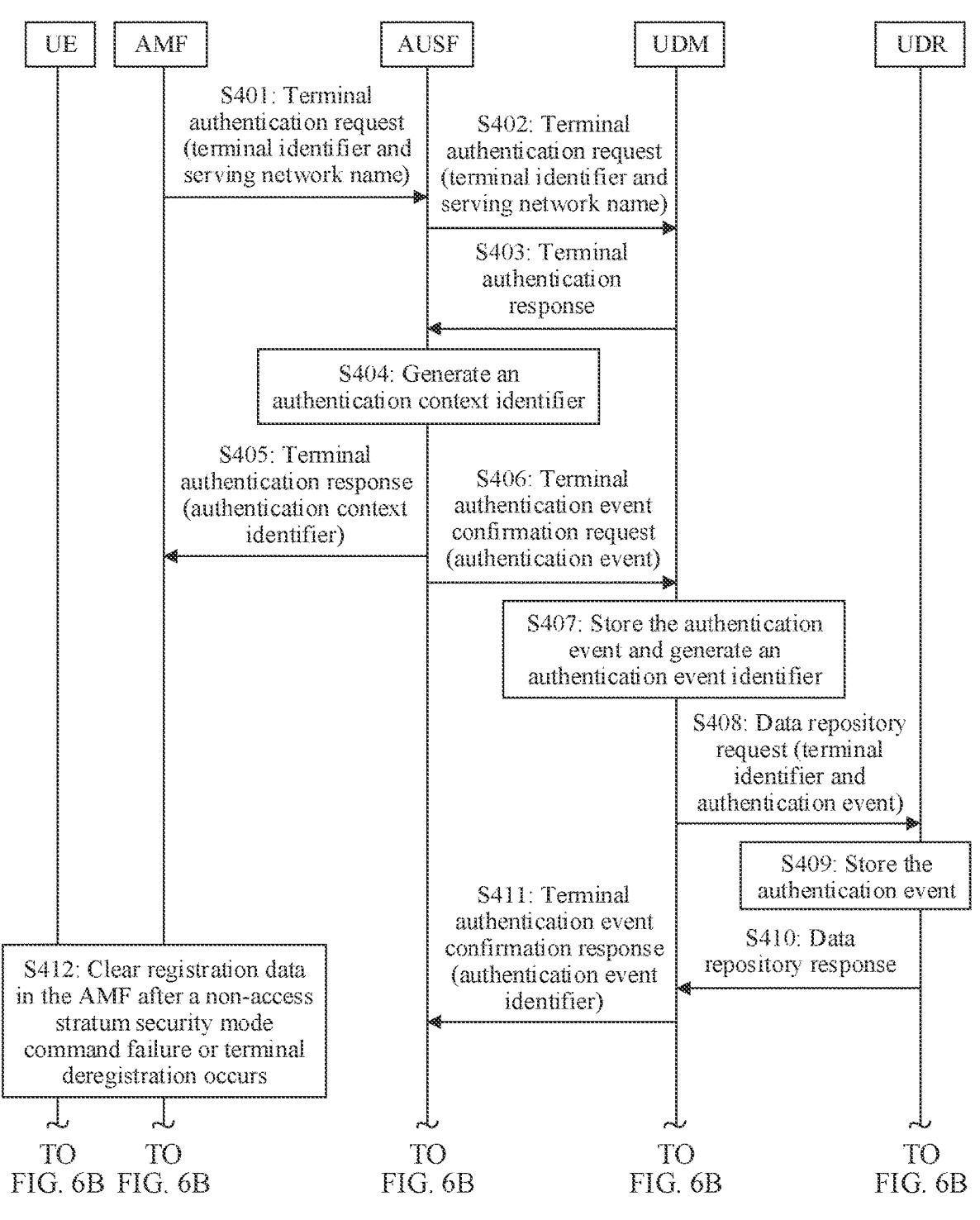

FIG. 6A and FIG. 6B are another schematic flowchart of an authentication event processing method according to an embodiment of this application. In an authentication procedure, an AUSF generates an authentication context identifier (authentication context identifier, AuthCtxID) and sends the authentication context identifier to an AMF. AuthCtxID is used to uniquely identify a current authentication procedure, and in a subsequent authentication procedure, AuthCtxID is always used to identify the current authentication procedure for interaction between the AMF and the AUSF. In addition, AuthCtxID is at a terminal granularity, and is generated based on a terminal identifier.

After the authentication procedure is completed, the AUSF sends an authentication event to a UDM. The UDM stores AuthEvent and generates a first authentication event identifier (AuthEventID), where AuthEventID is used to uniquely identify the authentication event. In addition, AuthEventID is at the terminal granularity, and is generated based on the terminal identifier. The UDM sends AuthEventID to the AUSF for storage w % ben returning a response. In a subsequent procedure that is related to the authentication event and that is between the AUSF and the UDM, the AUSF and the UDM use AuthEventID to interact with each other.

When a NAS SMC failure or terminal deregistration occurs, the AMF invokes an existing service of the AUSF to notify the AUSF to delete the authentication event, where a service request includes AuthCtxID. The AUSF then invokes an existing service of the UDM to notify the UDM to delete the authentication event, where a service request includes AuthEventID. Finally, the UDM deletes the stored authentication event based on AuthEventID. The UDM invokes an existing service of a UDR to notify the UDR to delete the authentication event, where a service request includes an SUPI. The UDR deletes the stored authentication event based on the SUPI.

However, if a terminal performs dual registration via two different serving networks, SUPIs in two authentication events are the same. Because AuthCtxID and AuthEventID each are at the terminal granularity, when the two identifiers are used to delete the authentication events, a problem of deleting the authentication events by mistake occurs.

If the terminal registers with one AMF and is successfully authenticated, and then moves from the AMF to another AMF, and a NAS SMC failure or deregistration occurs subsequently, there is no available AuthCtxID between the new AMF and the AUSF. Therefore, authentication event deletion cannot be completed by using the current solution.

Based on this, embodiments of this application further provide an authentication event processing method, apparatus, and system. When an authentication event in a unified data repository network element needs to be deleted, an authentication event associated with a serving network name is deleted, so that the unified data repository network element does not delete the authentication event by mistake in a scenario in which the terminal performs dual registration via two different serving networks, or the like. Therefore, the authentication event in the unified data repository network element can be accurately deleted, and a communication exception caused by deleting the authentication event by mistake is prevented.

In this application, meanings of the authentication event, an authentication result, or an authentication status are the same, and all indicate whether authentication succeeds. In some scenarios, it is described that the UDM stores the authentication event; in some other scenarios, it is described that the UDR stores the authentication event as an authentication status, and so on. In the following embodiments of this application, the authentication event is used as an example for description.

The following describes in detail the authentication event processing method provided in embodiments of this application with reference to FIG. 1 to FIG. 6A and FIG. 6B.

It should be noted that names of messages between network elements, names of parameters in the messages, or the like in the following embodiments of this application are merely examples, and there may alternatively be other names during specific implementation. This is not specifically limited in embodiments of this application.

Figure 7:
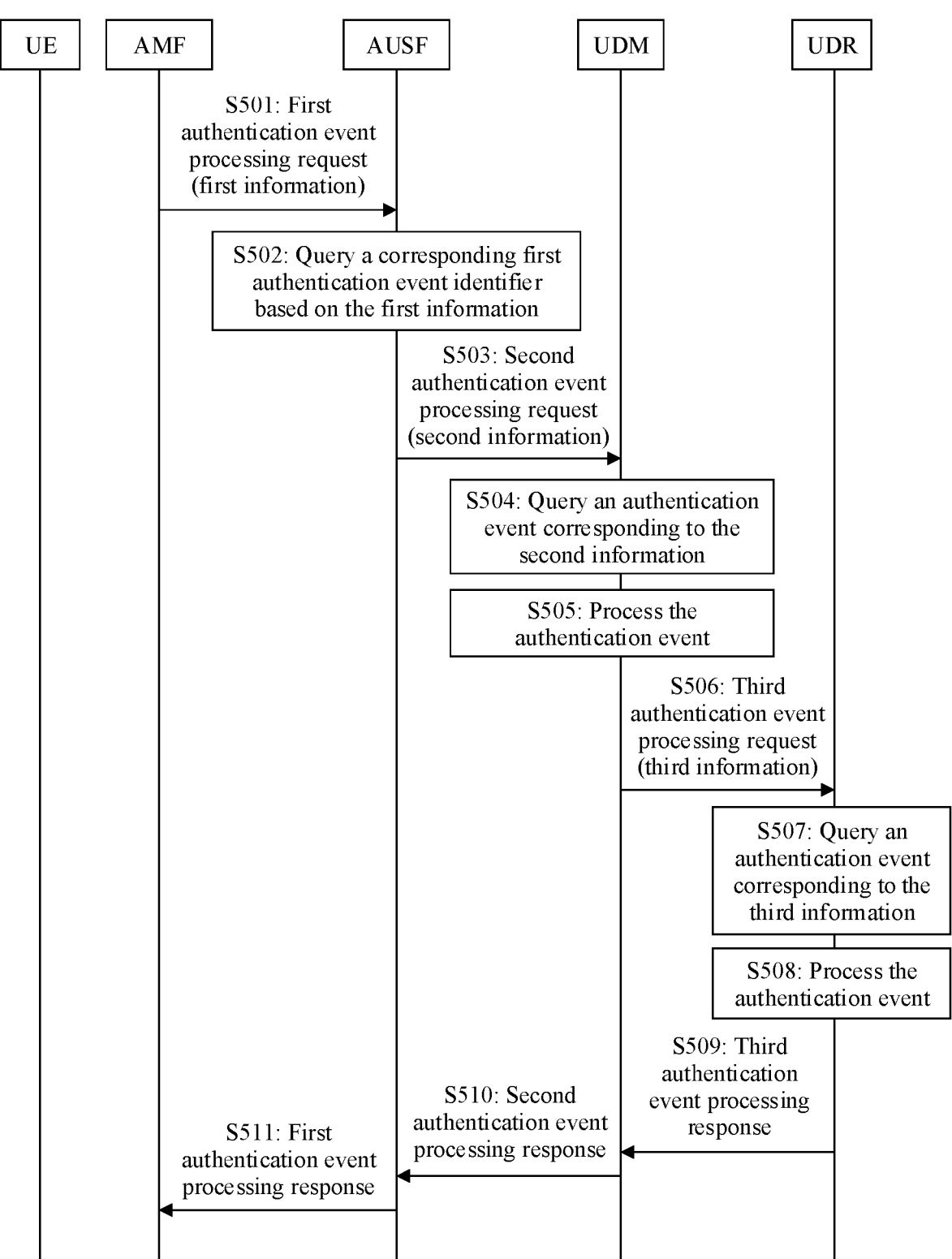
FIG. 7 is another schematic flowchart of an authentication event processing method according to an embodiment of this application.

FIG. 7 is a schematic flowchart of an authentication event processing method according to an embodiment of this application. The method may include the following steps.

S501: A mobility management network element sends a first authentication event processing request to an authentication server network element, where the first authentication event processing request includes first information, and the first information includes one or more of the following information: a terminal identifier, a serving network name, an authentication context identifier. Correspondingly, the authentication server network element receives the first authentication event processing request.

In some of the following example scenarios, the AMF needs to trigger the AUSF to process an authentication event. In an example scenario, the AUSF authenticates a terminal, so that bidirectional authentication between a network side and the terminal can be implemented, and a key for derivation can be generated. The AMF sends a NAS SMC to the terminal to negotiate a security algorithm of a NAS channel. In a negotiation process, the foregoing key needs to be used. However, if a NAS SMC failure occurs, a subsequent procedure cannot be performed, and the AMF triggers the AUSF to process the authentication event. In another example scenario, if the terminal no longer continues to camp on a visited network, that is, terminal deregistration occurs, the AMF may trigger the AUSF to process the authentication event.

Specifically, the AMF sends the first authentication event processing request to the AUSF. The first authentication event processing request includes the first information.

In an implementation, the first information includes the authentication context identifier (AuthCtxID). AuthCtxID is used to uniquely identify an authentication procedure between the AMF and the AUSF, and in a subsequent authentication procedure, AuthCtxID may be used to identify the current authentication procedure for interaction between the AMF and the AUSF. In addition, AuthCtxID may be at a terminal granularity, and is generated based on the terminal identifier. Certainly, the first information may further include the terminal identifier.

In another implementation, if the terminal performs dual registration via two different serving networks, two authentication events exist, and terminal identifiers in the two authentication events are the same. The authentication events stored in a UDM and the authentication events stored in a UDR are associated with the terminal identifiers and serving network names. Therefore, the first information includes AuthCtxID and/or the serving network name, and may further include the terminal identifier.

S502: The authentication server network element queries a corresponding first authentication event identifier based on the first information.

In an authentication process, after storing the authentication event, the UDM sends AuthEventID to the AUSF, and the AUSF stores AuthEventID. AuthEventID is used to uniquely identify the authentication event. Optionally, the AUSF may correspondingly store the first authentication event identifier (AuthEventID) based on the terminal identifier, the serving network name, and/or AuthCtxID. In a subsequent procedure that is related to the authentication event and that is between the AUSF and the UDM, the AUSF and the UDM may use AuthEventID to interact with each other. Therefore, after receiving the first authentication event processing request, the AUSF may query corresponding AuthEventID based on the first information.

Specifically, in an implementation. AuthEventID may be based on the terminal granularity, to be specific. AuthEventID is generated based on the terminal identifier. In this case, the first information may include the terminal identifier, and may further include AuthCtxID. The AUSF finds corresponding AuthEventID based on the terminal identifier and/or AuthCtxID.

In another implementation, if the terminal previously performs dual registration via two different serving networks, AuthEventID may be generated based on the terminal identifier and/or a serving network name. In this case, the first information may include the terminal identifier and/or the serving network name, and may further include AuthCtxID. The AUSF may find corresponding AuthEventID based on the terminal identifier, the serving network name, and/or AuthCtxID.

S503: The authentication server network element sends a second authentication event processing request to the unified data management network element, where the second authentication event processing request includes second information, and the second information includes one or more of the following information: the terminal identifier, the serving network name, the first authentication event identifier. Correspondingly, the unified data management network element receives the second authentication event processing request.

After finding corresponding AuthEventID, the AUSF sends the second authentication event processing request to the UDM. The second authentication event processing request includes the second information.

Corresponding to the foregoing implementation, if AuthEventID may be based on the terminal granularity, the second information includes AuthEventID, and may further include the terminal identifier. If the terminal previously performs dual registration via two different serving networks, AuthEventID may be generated based on the terminal identifier and/or a serving network name. In this case, the second information includes AuthEventID and the serving network name, and may further include the terminal identifier.

S504: The unified data management network element queries an authentication event corresponding to the second information.

In the authentication procedure, the UDM correspondingly stores the authentication event based on the terminal identifier, the serving network name, and/or AuthEventID. Therefore, after receiving the second authentication event processing request, the UDM queries, based on the second information carried in the request, the authentication event corresponding to the second information.

If the terminal previously performs dual registration via two different serving networks, and the authentication event is associated with a serving network name, the corresponding authentication event may be found based on the serving network name and/or AuthEventID, or based on the terminal identifier. However, in the foregoing embodiment, when the terminal performs dual registration via two different serving networks, two authentication events exist, and terminal identifiers in the two authentication events are the same. If the authentication events are stored based only on the terminal identifiers, when the authentication events are processed, the authentication events may be processed by mistake.

S505: The unified data management network element processes the authentication event.

After receiving the second authentication event processing request and finding the corresponding authentication event, the UDM processes the found authentication event. Processing the authentication event may be deleting or clearing the found authentication event, identifying the found authentication event as invalid, or updating, by the UDM, the found authentication event to failed. Deleting the found authentication event in time can save repository space of the UDM or a remote server, and improve communication reliability. Identifying the found authentication event as invalid in time or updating the found authentication event to failed in time can improve communication reliability.

S506: The unified data management network element sends a third authentication event processing request to the unified data repository network element, where the third authentication event processing request includes third information, and the third information includes one or more of the following information: the terminal identifier, the serving network name, a second authentication event identifier. Correspondingly, the unified data repository network element receives the third authentication event processing request.

The UDR also stores the authentication event. If the authentication event is not processed in time, the UDM can still obtain the authentication event from the UDR. Therefore, the UDM sends the third authentication event processing request to the UDR. The third authentication event processing request includes the third information. The third information includes the terminal identifier, the serving network name, and/or the second authentication event identifier (AuthStatusID). AuthStatusID is used to uniquely identify the authentication event stored in the UDR, and indicates that the UDR successfully stores the authentication event. The UDR may store the authentication event or authentication status based on AuthStatusID. For example, the UDR stores a correspondence between AuthStatusID and the authentication event or authentication status, and the authentication event or authentication status may be found based on AuthStatusID. Subsequent interaction between the UDR and the UDM may be performed based on AuthStatusID, and a plurality of types of information such as the terminal identifier, the authentication event, and the serving network name do not need to be carried. This may reduce signaling overheads and simplify a procedure.

If the terminal previously performs dual registration via two different serving networks, and the authentication event is associated with a serving network name, the corresponding authentication event may be found based on the serving network name and/or AuthStatusID, or based on the terminal identifier.

It may be understood that, the first authentication event identifier may be the same as the second authentication event identifier, or the second authentication event identifier is obtained by performing an operation on the first authentication event identifier. The unified data management network element may also store a correspondence between the first authentication event identifier and the second authentication event identifier.

S507: The unified data repository network element queries an authentication event corresponding to the third information.

In the authentication procedure, the UDR correspondingly stores the authentication event based on the terminal identifier, the serving network name, and/or AuthStatusID. Therefore, after receiving the third authentication event processing request, the UDR queries, based on the third information carried in the request, the authentication event corresponding to the third information.

If the terminal previously performs dual registration via two different serving networks, and the authentication event is associated with a serving network name, the corresponding authentication event may be found based on the serving network name and/or AuthStatusID, or based on the terminal identifier. However, in the foregoing embodiment, when the terminal performs dual registration via two different serving networks, two authentication events exist, and terminal identifiers in the two authentication events are the same. If the authentication events are stored based only on the terminal identifiers, when the authentication events are processed, the authentication events may be processed by mistake.

S508: The unified data repository network element processes the authentication event.

After receiving the third authentication event processing request and finding the corresponding authentication event, the UDR processes the found authentication event. Processing the authentication event may be deleting or clearing the found authentication event, identifying the found authentication event as invalid, or updating, by the UDR, the found authentication event to failed. Deleting the found authentication event in time can save repository space of the UDR or the remote server, and improve communication reliability. Identifying the found authentication event as invalid in time or updating the found authentication event to failed in time can improve communication reliability.

S509: The unified data repository network element sends a third authentication event processing response to the unified data management network element. Correspondingly, the unified data management network element receives the third authentication event processing response.

The third authentication event processing response indicates, to the UDM, a result of processing the authentication event, or is used to notify the UDM of the result of processing the authentication event.

S510: The unified data management network element sends a second authentication event processing response to the authentication server network element. Correspondingly, the authentication server network element receives the second authentication event processing response.

The second authentication event processing response indicates, to the AUSF, the result of processing the authentication event, or is used to notify the AUSF of the result of processing the authentication event.

S511: The authentication server network element sends a first authentication event processing response to the mobility management network element. Correspondingly, the mobility management network element receives the first authentication event processing response.

The first authentication event processing response indicates, to the AMF, the result of processing the authentication event and that the UDM or the UDR has been triggered to process the authentication event, or is used to notify the AMF of the result of processing the authentication event and that the UDM or the UDR has been triggered to process the authentication event.

According to the authentication event processing method provided in this embodiment of this application, when the authentication event in the unified data repository network element needs to be deleted, the unified data repository network element deletes the authentication event associated with the serving network name, so that the unified data repository network element does not delete the authentication event by mistake in a scenario in which the terminal performs dual registration via two different serving networks, or the like. Therefore, the authentication event in the unified data repository network element can be accurately deleted, and a communication exception caused by deleting the authentication event by mistake is prevented.

Figure 8A:
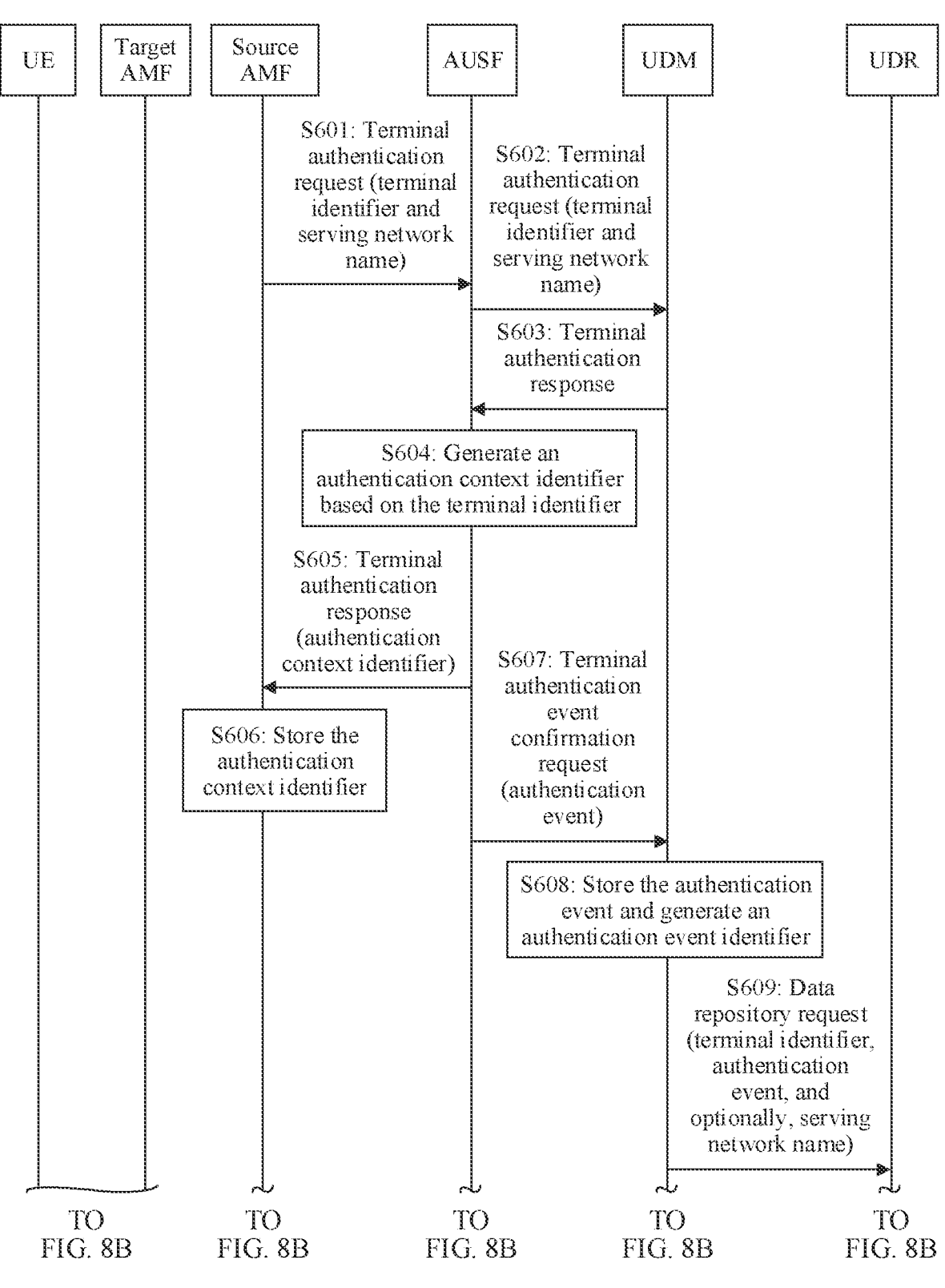
FIG. 8A to FIG. 8C are another schematic flowchart of an authentication event processing method according to an embodiment of this application.
Figure 8B:
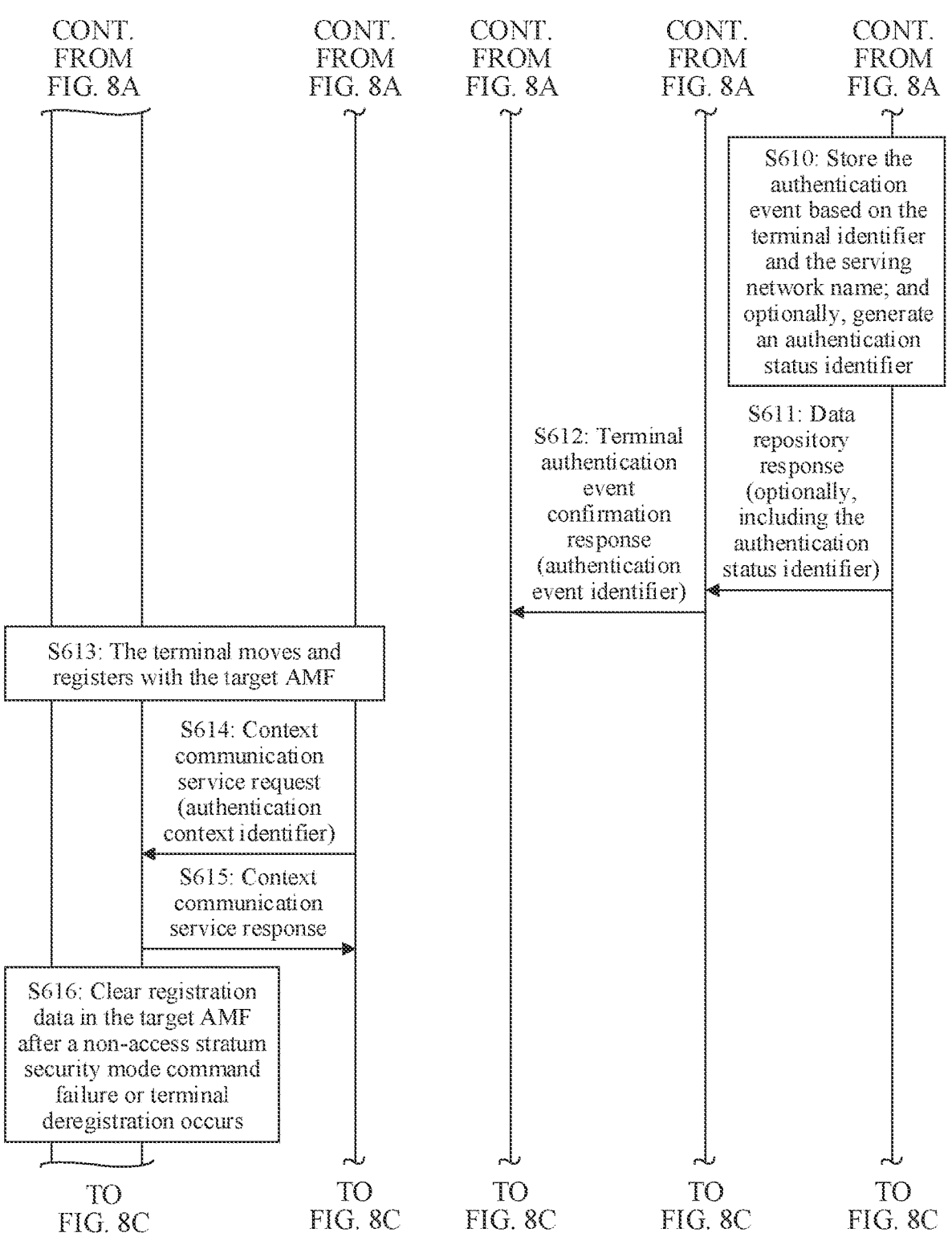
Figure 8C:
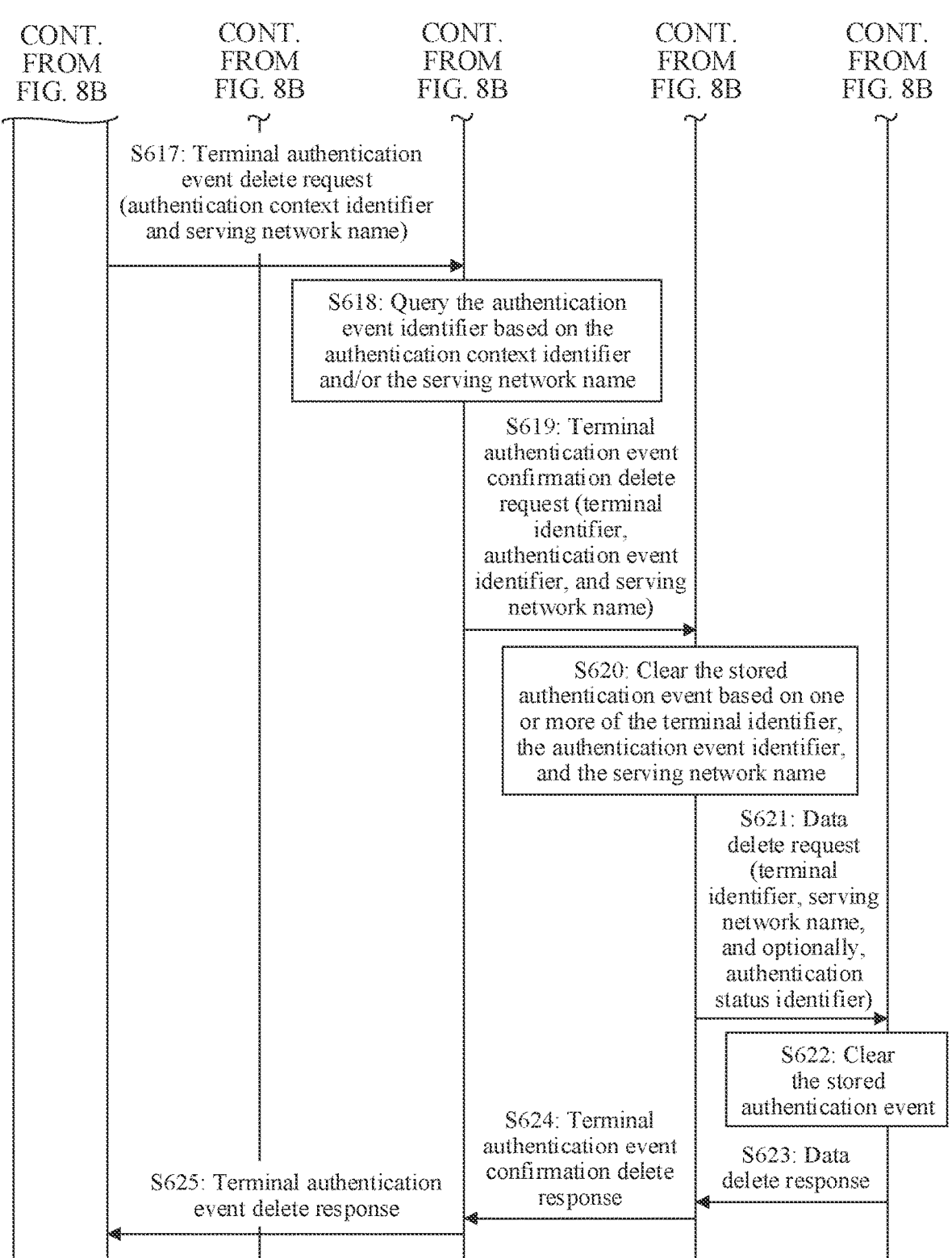

FIG. 8A to FIG. 8C are a schematic flowchart of an authentication event processing method according to an embodiment of this application. The method may include the following steps.

S601: A source AMF (source AMF, S-AMF) sends a terminal authentication request to an AUSF, where the terminal authentication request includes a terminal identifier and a serving network name. Correspondingly, the AUSF receives the terminal authentication request.

Authentication performed by a network side on a terminal is determined by the AUSF in a home network. Therefore, the AMF in a visited network sends the terminal authentication request (for example, $N_{ausf}$_UEAuthentication_Auth Request) to the AUSF. Herein, the source AMF is an AMF corresponding to a terminal that has not moved. The AUSF receives the terminal authentication request. The terminal authentication request includes the terminal identifier and the serving network name. The terminal identifier may be, for example, an SUPI or an SUCI. The serving network name is a name of the visited network in which the source AMF is located, and may also be referred to as a serving network identifier.

The AUSF authenticates the terminal based on the terminal identifier. For an authentication procedure or algorithm, refer to an existing procedure or algorithm.

S602: The AUSF sends a terminal authentication request to a UDM, where the terminal authentication request includes the terminal identifier and the serving network name. Correspondingly, UDM receives the terminal authentication request.

After authenticating the terminal, the AUSF sends the terminal authentication request (for example, $N_{udm}$_UEAuthentication_Get Request) to the UDM, to notify the UDM of the identifier of the authenticated terminal and the serving network name. The UDM receives the terminal authentication request.

S603: The UDM sends a terminal authentication response to the AUSF. Correspondingly, the AUSF receives the terminal authentication response.

The UDM sends the terminal authentication response (for example, $N_{ausf}$_UEAuthentication_Get Response) to the AUSF, to indicate that the UDM receives the terminal authentication request.

S604: The AUSF generates AuthCtxID based on the terminal identifier.

The AUSF generates AuthCtxID based on the terminal identifier carried in the terminal authentication request sent by the source AMF. AuthCtxID is used to uniquely identify a current authentication procedure, and in a subsequent authentication procedure, AuthCtxID may be used to identify the current authentication procedure for interaction between the AMF and the AUSF. In addition, AuthCtxID is at a terminal granularity, and is generated based on the terminal identifier.

S605: The AUSF sends a terminal authentication response to the source AMF, where the terminal authentication response includes AuthCtxID. Correspondingly, the source AMF receives the terminal authentication response.

After authenticating the terminal, the AUSF sends the terminal authentication response to the source AMF. The terminal authentication response indicates that terminal authentication succeeds or fails. If the terminal authentication succeeds, the terminal authentication response further includes AuthCtxID. AuthCtxID is used to uniquely identify a current authentication procedure, and in a subsequent authentication procedure, AuthCtxID is always used to identify the current authentication procedure for interaction between the AMF and the AUSF.

S606: The source AMF stores AuthCtxID.

The source AMF stores AuthCtxID locally or in a remote server.

S607: The AUSF sends a terminal authentication event confirmation request to the UDM, where the terminal authentication event confirmation request includes an authentication event. Correspondingly the UDM receives the terminal authentication event confirmation request.

After completing the terminal authentication, the AUSF sends the authentication event to the UDM for storage, and therefore, sends the terminal authentication event confirmation request (for example, $N_{udm}$_UEAuthentication_Result-Confirmation Request) to the UDM. The terminal authentication event confirmation request includes the authentication event (AuthEvent).

For example, information that may be included in the authentication event and possible definitions are shown in the following Table 1.

TABLE 1

| Information included in the authentication event and definitions | | | | |
|---|---|---|---|---|
| Attribute name | Data type | P | Cardinality | Description |
| nfInstanceId | nfInstanceId | M | 1 | Identifier of an NF entity where authentication occurs |
| Success | Success | M | 1 | True indicates success; false indicates no success |
| Time stamp | Data time | M | 1 | Time stamp of authentication |
| Authentication type | Authentication type | M | 1 | Character string Authentication type ("EAP_AKA_PRIME" or "5G_AKA") |
| Serving network name | Serving network name | M | 1 | Refer to related standards |

S608: The UDM stores the authentication event and generates an authentication event identifier (AuthEventID).

After receiving the terminal authentication event confirmation request, the UDM may correspondingly store, based on the terminal identifier carried in the terminal authentication request sent by the AUSF, the authentication event carried in the terminal authentication event confirmation request, and may further generate AuthEventID. AuthEventID is used to uniquely identify the authentication event. In addition, AuthEventID is at the terminal granularity, and is generated based on the terminal identifier.

S609: The UDM sends a data repository request to a UDR, where the data repository request includes the terminal identifier and the authentication event, and may further include the serving network name. Correspondingly, the UDR receives the data repository request.

After storing the authentication event, the UDM sends data repository request (for example, $N_{udr}$_DataRepository_Put Request) to the UDR. The data repository request includes the terminal identifier and the authentication event, and the authentication event includes the serving network name. Optionally, the data repository request may further include the serving network name. The UDR receives the data repository request.

S610: The UDR stores the authentication event based on the terminal identifier and the serving network name, and optionally, further generates an authentication status identifier (AuthStatusID).

The UDR correspondingly stores the authentication event based on the terminal identifier and the serving network name, or stores the authentication event as an authentication status.

Specifically, in an implementation, if the data repository request includes the serving network name, the UDR may store the authentication event based on the terminal identifier and the serving network name. For example, the UDR stores a correspondence between the terminal identifier, the serving network name, and the authentication event. Subsequently, the UDR may find the authentication event based on the terminal identifier and the serving network name.

In another implementation, if the data repository request does not include the serving network name, the UDR may store the authentication event based on the terminal identifier and the serving network name that is in the authentication event. For example, the UDR stores a correspondence between the terminal identifier, the serving network name that is in the authentication event, and the authentication event. Subsequently, the UDR may find the authentication event based on the terminal identifier and the serving network name.

Optionally, the UDR may further generate AuthStatusID. AuthStatusID is used to uniquely identify the authentication event stored in the UDR, and indicates that the UDR successfully stores the authentication event. Optionally, the UDR may further generate AuthStatusID based on the terminal identifier, the serving network name, and/or the authentication event that are/is included in the data repository request. The UDR may store the authentication event or authentication status based on AuthStatusID. For example, the UDR stores a correspondence between AuthStatusID and the authentication event or authentication status, and the authentication event or authentication status may be found based on AuthStatusID. Subsequent interaction between the UDR and the UDM may be performed based on AuthStatusID, and a plurality of types of information such as the terminal identifier, the authentication event, and the serving network name do not need to be carried. This may reduce signaling overheads and simplify a procedure.

AuthStatusID may be the same as AuthEventID, or AuthStatusID may be obtained by performing an operation on AuthEventID.

S611. The UDR sends a data repository response to the UDM. Optionally, the data repository response further includes AuthStatusID. Correspondingly, the UDM receives the data repository response.

After storing the authentication event, the UDR sends the data repository response (for example, $N_{udm}$_DataRepository_Put Response) to the UDM. Optionally, the data repository response further includes AuthStatusID. Optionally, the UDM may store a correspondence between AuthStatusID and AuthEventID. Subsequent interaction between the UDR and the UDM may be performed based on AuthStatusID.

S612: The UDM sends a terminal authentication event confirmation response to the AUSF, where the terminal authentication event confirmation response includes the authentication event identifier. Correspondingly, the AUSF receives the terminal authentication event confirmation response.

The UDM sends AuthEventID to the AUSF for storage when returning the response. Optionally, the AUSF may store a correspondence between AuthCtxID and AuthEventID. In a subsequent procedure that is related to the authentication event and that is between the AUSF and the UDM, the AUSF and the UDM use AuthEventID to interact with each other.

S613: The source AMF detects that the terminal moves and registers with a target AMF.

When an AMF changes due to movement of the terminal, or an AMF that serves the terminal changes due to another case, the source AMF detects that the terminal moves from the source AMF and registers with the target AMF (target AMF, T-AMF).

S614: The source AMF sends a context communication service request to the target AMF, where the context communication service request includes AuthCtxID. Correspondingly, the target AMF receives the context communication service request.

After the source AMF detects that the terminal moves and registers with the target AMF, the target AMF does not store a context of the terminal. The context of the terminal may include AuthCtxID and other registration data (or referred to as subscription data) of the terminal. Therefore, the source AMF needs to send the context communication service request (for example, $N_{amf}$_Communication_CreateContext Request) to the target AMF, where the context communication service request includes AuthCtxID. The target AMF receives the context communication service request and obtains AuthCtxID.

If the target AMF does not have AuthCtxID, the target AMF cannot process the authentication event in a subsequent procedure.

S615: The target AMF sends a context communication service response to the source AMF. Correspondingly, the source AMF receives the context communication service response.

After receiving the context communication service request, the target AMF sends the context communication service response (for example, $N_{amf}$_Communication_CreateContext Response) to the source AMF. The context communication service response indicates that the target AMF has received the sent context of the terminal, and the context communication service response includes AuthCtxID.

S616: Clear registration data in the target AMF after a NAS SMC failure or terminal deregistration occurs.

As described above, the target AMF obtains the context of the terminal from the source AMF, where the context includes the registration data of the terminal. After the NAS SMC failure or terminal deregistration occurs, the target AMF clears the registration data of the terminal stored in the target AMF, to properly use repository space.

S617: The target AMF sends a terminal authentication event delete request to the AUSF, where the terminal authentication event delete request includes AuthCtxID and the serving network name. Correspondingly, the AUSF receives the terminal authentication event delete request.

After the NAS SMC failure or terminal deregistration occurs, because the UDM and the UDR each further store the terminal authentication event, the target AMF may send the terminal authentication event delete request (for example, $N_{ausf}$_UEAuthentication_Authenticate Delete Request) to the AUSF based on AuthCtxID. However, if the terminal performs dual registration via visited networks before the NAS SMC failure or terminal deregistration occurs, and AuthCtxID is generated based on the terminal identifier, the terminal authentication event delete request further needs to include a serving network name. The AUSF receives the terminal authentication event delete request.

S618: The AUSF queries AuthEventID based on AuthCtxID and/or the serving network name.

In S612, the UDM sends AuthEventID to the AUSF, and AuthEventID is generated based on the terminal identifier.

Therefore, after receiving the terminal authentication event delete request, the AUSF may find AuthEventID based on AuthCtxID and/or the serving network name that are/is carried in the terminal authentication event delete request.

S619: The AUSF sends a terminal authentication event confirmation delete request to the UDM, where the terminal authentication event confirmation delete request includes the terminal identifier, AuthEventID, and the serving network name. Correspondingly, the UDM receives the terminal authentication event confirmation delete request.

After finding AuthEventID, the AUSF sends the terminal authentication event confirmation delete request (for example, $N_{udm}$_UEAuthentication Event Confirmation Delete Request) to the UDM, to request to delete the authentication event in the UDM. The terminal authentication event confirmation delete request includes AuthEventID. If the terminal performs dual registration via visited networks before the NAS SMC failure or terminal deregistration occurs, and AuthEventID is generated based on the terminal identifier, the terminal authentication event confirmation delete request further needs to include a serving network name. Optionally, the terminal authentication event confirmation delete request may further include the terminal identifier.

S620: The UDM clears the stored authentication event based on one or more of the terminal identifier, AuthEventID, the serving network name.

After receiving the terminal authentication event confirmation delete request, the UDM finds the correspondingly stored authentication event based on the one or more of the terminal identifier, AuthEventID, the serving network name, and clears (or deletes) the found authentication event. Alternatively, the UDM identifies the found authentication event as invalid; or the UDM updates the found authentication event to failed.

For example, if the terminal registers in one visited network, the UDM may find the authentication event based on AuthEventID and/or the terminal identifier.

For another example, if the terminal registers in two visited networks, the UDM may find the authentication event based on AuthEventID and a serving network name.

S621: The UDM sends a data delete request to the UDR, where the data delete request includes the terminal identifier and the serving network name. Optionally, the data delete request further includes authStatusID.

As described above, the UDR also stores the authentication event. If the UDR does not process the authentication event in time after the NAS SMC failure or terminal deregistration occurs, the UDM may still obtain the authentication event from the UDR. Therefore, the UDM sends the data delete request to the UDR, w % here the data delete request includes the terminal identifier and the serving network name.

If the UDR further sends authStatusID to the UDM in S611, and the UDM stores the correspondence between authStatusID and authEvenID, when receiving the data delete request, the UDM may find AuthStatusID based on AuthEventID. Therefore, the data delete request may carry only authStatusID, to reduce signaling overheads, and certainly, may further carry the terminal identifier and the serving network name.

S622: The UDR clears the stored authentication event.

In the UDR, authStatusID is correspondingly stored with the terminal identifier, the serving network name, and the authentication event. Therefore, after receiving the data delete request, the UDR may find the corresponding authentication event based on authStatusID, based on the terminal identifier and the serving network name, or based on auth-StatusID, the terminal identifier, and the serving network name. The UDR processes the found authentication event, and specifically, may clear or delete the found authentication event, identify the found authentication event as invalid, or update the found authentication event to failed.

S623: The UDR sends a data delete response to the UDM. Correspondingly, the UDM receives the data delete response.

The data delete response indicates that the UDR has processed the authentication event and indicates a processing result.

S624: The UDM sends a terminal authentication event confirmation delete response (for example, N*_ausf_*UEAuthentication Event Confirmation Delete Response) to the AUSF. Correspondingly, the AUSF receives the terminal authentication event confirmation delete response.

The terminal authentication event confirmation delete response indicates that the UDM has processed the authentication event and indicates a processing result.

S625: The AUSF sends a terminal authentication event delete response (for example, N*_amf_*UEAuthentication_Authenticate Delete Response) to the target AMF. Correspondingly, the target AMF receives the terminal authentication event delete response.

The terminal authentication event delete response indicates that the AUSF has notified the UDM to process the authentication event and indicates a processing result of the authentication event.

According to the authentication event processing method provided in this embodiment of this application, when the authentication event in the unified data repository network element needs to be deleted, the unified data repository network element deletes the authentication event associated with the serving network name, so that the unified data repository network element does not delete the authentication event by mistake in a scenario in which the terminal performs dual registration via two different serving networks, or the like. Therefore, the authentication event in the unified data repository network element can be accurately deleted, and a communication exception caused by deleting the authentication event by mistake is prevented. In addition, after detecting that the terminal moves and registers with the target mobility management network element, the source mobility management network element sends the authentication context identifier to the target mobility management network element, so that when the NAS SMC failure or terminal deregistration occurs, the target mobility management network element can initiate an authentication event processing procedure, to improve reliability of authentication event processing.

Figure 9A:
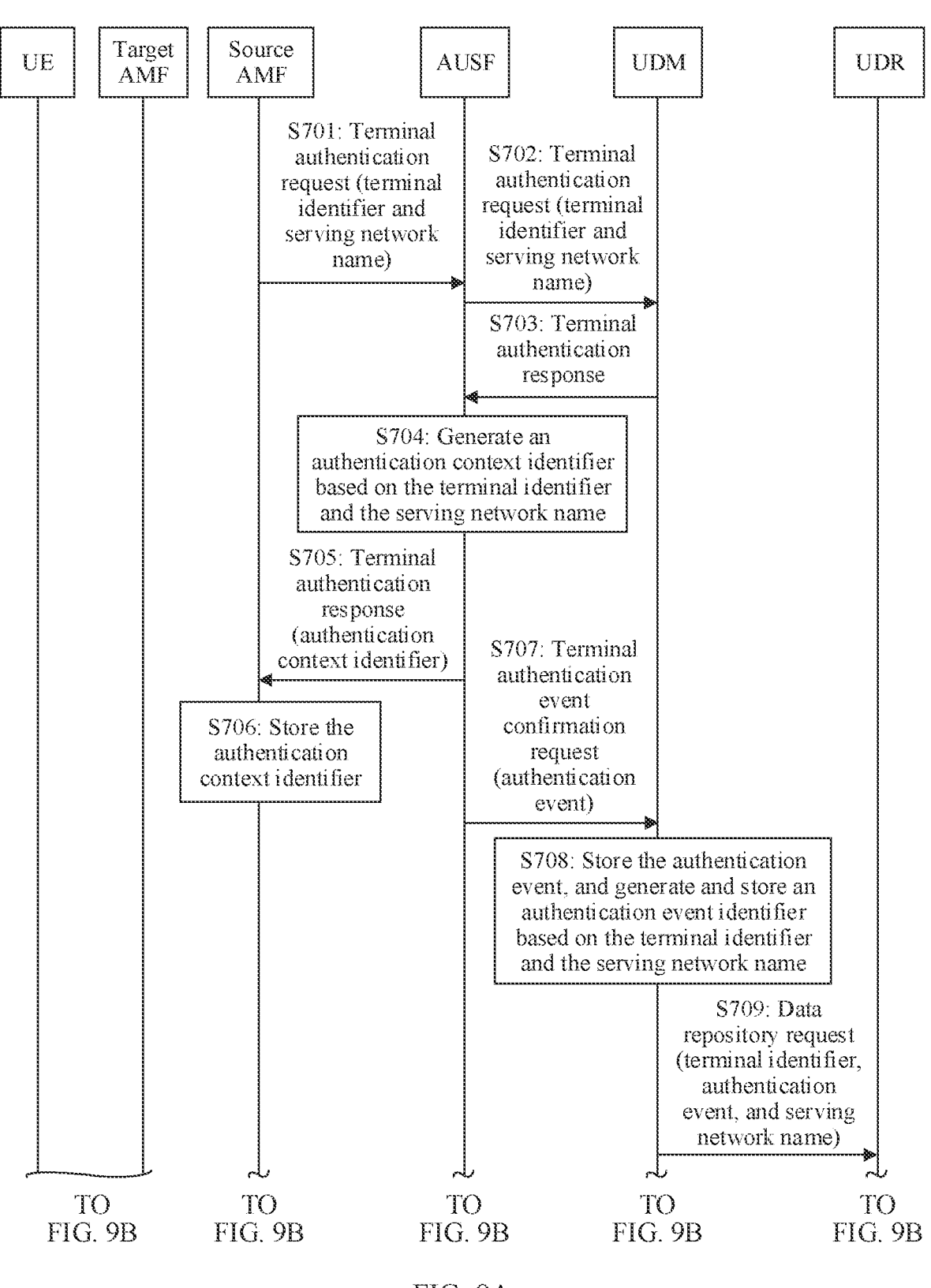
FIG. 9A to FIG. 9C are another schematic flowchart of an authentication event processing method according to an embodiment of this application.
Figure 9B:
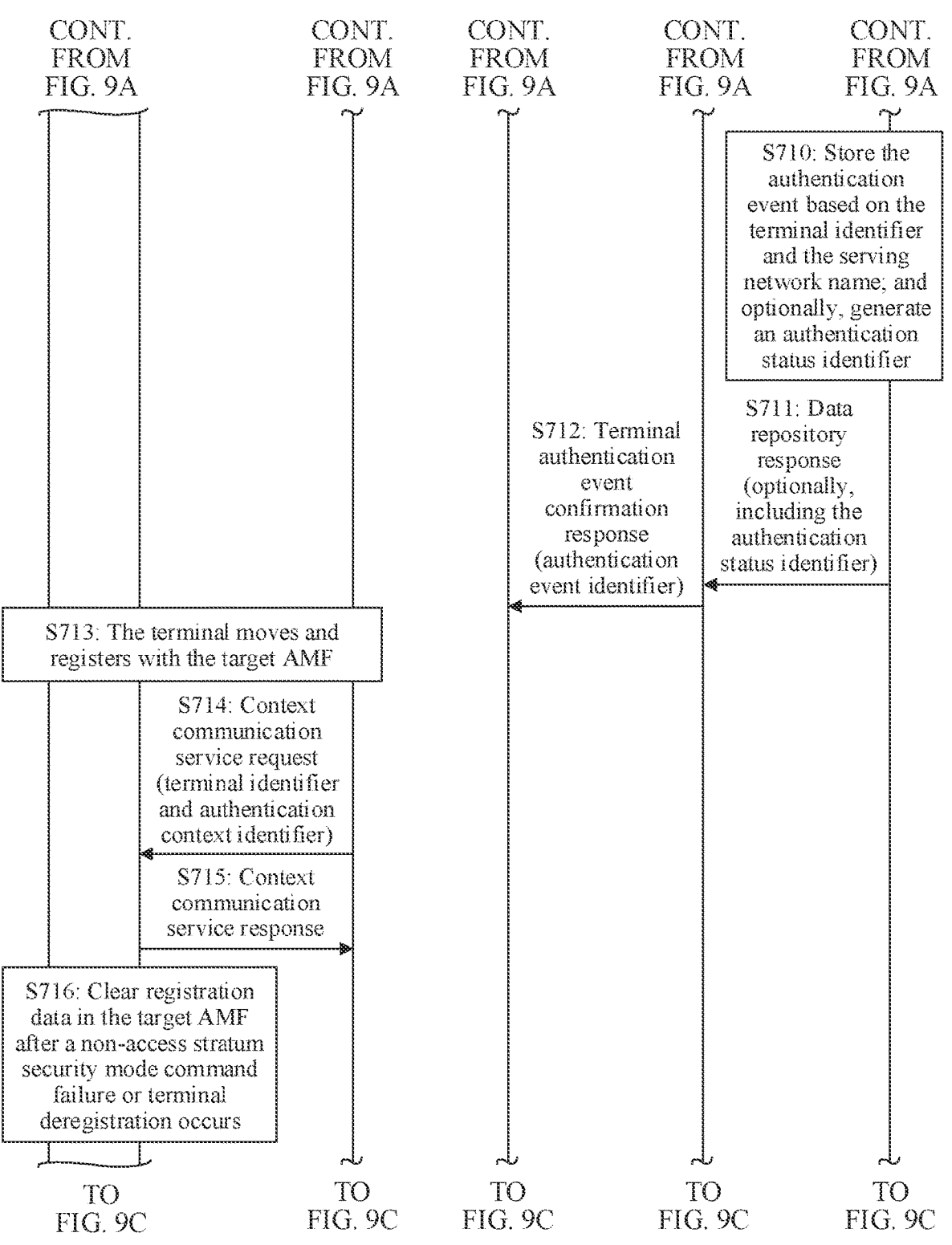
Figure 9C:
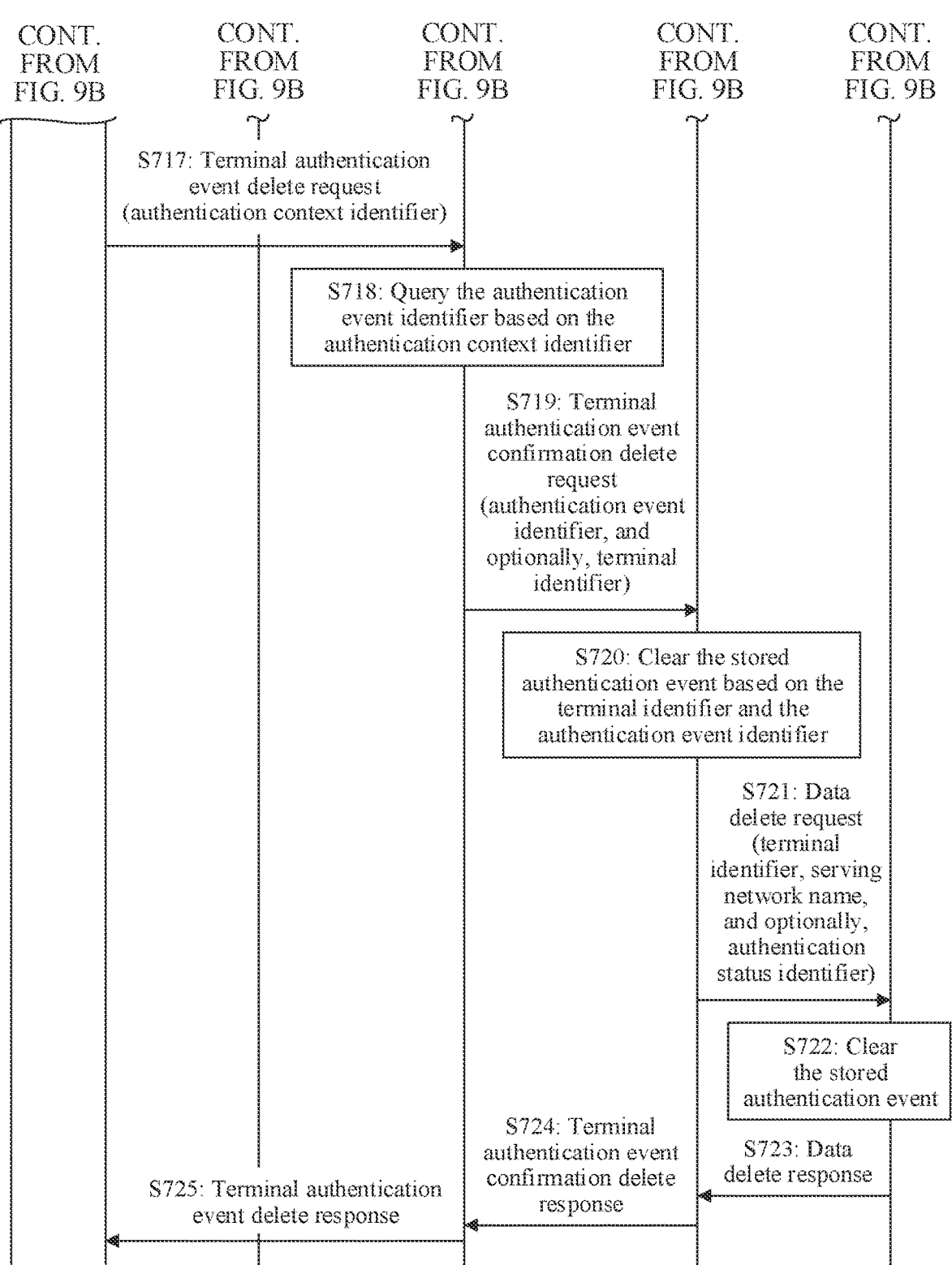

FIG. 9A to FIG. 9C are a schematic flowchart of an authentication event processing method according to an embodiment of this application. The method may include the following steps.

S701: A source AMF sends a terminal authentication request to an AUSF, where the terminal authentication request includes a terminal identifier and a serving network name. Correspondingly, the AUSF receives the terminal authentication request.

For specific implementation of this step, refer to step S601 in the embodiment shown in FIG. 8A to FIG. 8C.

S702: The AUSF sends a terminal authentication request to a UDM, where the terminal authentication request includes the terminal identifier and the serving network name. Correspondingly, UDM receives the terminal authentication request.

For specific implementation of this step, refer to step S602 in the embodiment shown in FIG. 8A to FIG. 8C.

S703: The UDM sends a terminal authentication response to the AUSF. Correspondingly, the AUSF receives the terminal authentication response.

For specific implementation of this step, refer to step S603 in the embodiment shown in FIG. 8A to FIG. 8C.

S704: The AUSF generates AuthCtxID based on the terminal identifier and the serving network name.

Different from the embodiment shown in FIG. 8A to FIG. 8C, in this embodiment, the AUSF generates AuthCtxID based on the terminal identifier and the serving network name. However, in the embodiment shown in FIG. 8A to FIG. 8C, the AUSF generates AuthCtxID based only on the terminal identifier. In other words, in the embodiment, AuthCtxID is at a terminal granularity. In this embodiment, in a subsequent procedure, in an interaction procedure between an AMF and the AUSF, the serving network name may not need to be carried, so that signaling overheads can be reduced.

In this embodiment, AuthCtxID corresponds to the terminal identifier and the serving network name. In this way, if a terminal performs dual registration via two different serving networks (where the UDM and a UDR each store two authentication events), and if an AMF in one of the serving networks notifies the terminal of a NAS SMC failure, or the terminal deregisters from an AMF in one of the serving networks, and the AMF may query a corresponding authentication event based on AuthCtxID, without causing same processing to be performed on the two authentication events in a subsequent procedure.

S705: The AUSF sends a terminal authentication response to the source AMF, where the terminal authentication response includes AuthCtxID. Correspondingly, the source AMF receives the terminal authentication response.

For specific implementation of this step, refer to step S605 in the embodiment shown in FIG. 8A to FIG. 8C. A difference lies in that AuthCtxID corresponds to the terminal identifier and the serving network name.

S706: The source AMF stores AuthCtxID.

For specific implementation of this step, refer to step S606 in the embodiment shown in FIG. 8A to FIG. 8C. A difference lies in that AuthCtxID corresponds to the terminal identifier and the serving network name.

S707: The AUSF sends a terminal authentication event confirmation request to the UDM, where the terminal authentication event confirmation request includes an authentication event. Correspondingly, the UDM receives the terminal authentication event confirmation request.

For specific implementation of this step, refer to step S607 in the embodiment shown in FIG. 8A to FIG. 8C.

S708: The UDM stores the authentication event and generates an authentication event identifier (AuthEventID).

For specific implementation of this step, refer to step S608 in the embodiment shown in FIG. 8A to FIG. 8C. In this embodiment, AuthEventID may be generated based on the terminal identifier and the serving network name. In this way, if the terminal performs dual registration via two different serving networks (where the UDM stores two authentication events), and if an AMF in one of the serving networks notifies the terminal of the NAS SMC failure, or the terminal deregisters from an AMF in one of the serving networks, the AUSF may query a corresponding authentication event based on AuthEventID, without causing same processing to be performed on the two authentication events in a subsequent procedure.

S709: The UDM sends a data repository request to the UDR, where the data repository request includes the terminal identifier, the authentication event, and the serving network name. Correspondingly, the UDR receives the data repository request.

For specific implementation of this step, refer to step S609 in the embodiment shown in FIG. 8A to FIG. 8C.

S710: The UDR stores the authentication event based on the terminal identifier and the serving network name, and optionally, further generates an authentication status identifier (AuthStatusID).

For specific implementation of this step, refer to step S610 in the embodiment shown in FIG. 8A to FIG. 8C.

S711: The UDR sends a data repository response to the UDM. Optionally, the data repository response further includes AuthStatusID. Correspondingly, the UDM receives the data repository response.

For specific implementation of this step, refer to step S611 in the embodiment shown in FIG. 8A to FIG. 8C.

S712: The UDM sends a terminal authentication event confirmation response to the AUSF, where the terminal authentication event confirmation response includes the authentication event identifier. Correspondingly, the AUSF receives the terminal authentication event confirmation response.

For specific implementation of this step, refer to step S612 in the embodiment shown in FIG. 8A to FIG. 8C. A difference lies in that the authentication event identifier may correspond to the terminal identifier and the serving network name. Optionally, the AUSF may correspondingly store AuthCtxID and AuthEventID, or store a correspondence between AuthCtxID and AuthEventID.

S713: The source AMF detects that the terminal moves and registers with a target AMF.

For specific implementation of this step, refer to step S613 in the embodiment shown in FIG. 8A to FIG. 8C.

S714: The source AMF sends a context communication service request to the target AMF, where the context communication service request includes AuthCtxID. Correspondingly, the target AMF receives the context communication service request.

For specific implementation of this step, refer to step S614 in the embodiment shown in FIG. 8A to FIG. 8C. A difference lies in that AuthCtxID corresponds to the terminal identifier and the serving network name.

S715: The target AMF sends a context communication service response to the source AMF. Correspondingly, the source AMF receives the context communication service response.

For specific implementation of this step, refer to step S615 in the embodiment shown in FIG. 8A to FIG. 8C.

S716: Clear registration data in the target AMF after the NAS SMC failure or terminal deregistration occurs.

For specific implementation of this step, refer to step S616 in the embodiment shown in FIG. 8A to FIG. 8C.

S717: The target AMF sends a terminal authentication event delete request to the AUSF, where the terminal authentication event delete request includes AuthCtxID. Correspondingly, the AUSF receives the terminal authentication event delete request.

A difference between this step and step S617 in the embodiment shown in FIG. 8A to FIG. 8C lies in that, in this embodiment, AuthCtxID corresponds to the terminal identifier and the serving network name, and therefore, before this step, if the terminal performs dual registration via different serving networks, the terminal authentication event delete request may carry AuthCtxID, and does not need to carry the serving network name. In this way, signaling overheads can be reduced, and a procedure can be simplified.

S718: The AUSF queries AuthEventID based on AuthCtxID.

A difference between this step and step S618 in the embodiment shown in FIG. 8A to FIG. 8C lies in that, in this embodiment, AuthCtxID is correspondingly stored with AuthEventID, and therefore, corresponding AuthEventID may be found based on AuthCtxID.

S719: The AUSF sends a terminal authentication event confirmation delete request to the UDM, where the terminal authentication event confirmation delete request includes AuthEventID, and optionally, further includes the terminal identifier. Correspondingly, the UDM receives the terminal authentication event confirmation delete request.

A difference between this step and step S618 in the embodiment shown in FIG. 8A to FIG. 8C lies in that, in this embodiment, AuthEventID is generated based on the serving network name, and therefore, the terminal authentication event confirmation delete request may carry AuthEventID without carrying the serving network name, and optionally, may further carry the terminal identifier.

S720: The UDM clears the stored authentication event based on one or more of the terminal identifier, AuthEventID, the serving network name.

For specific implementation of this step, refer to step S620 in the embodiment shown in FIG. 8A to FIG. 8C.

S721: The UDM sends a data delete request to the UDR, where the data delete request includes the terminal identifier and the serving network name. Optionally, the data delete request further includes authStatusID.

For specific implementation of this step, refer to step S621 in the embodiment shown in FIG. 8A to FIG. 8C.

S722: The UDR clears the stored authentication event.

For specific implementation of this step, refer to step S622 in the embodiment shown in FIG. 8A to FIG. 8C.

S723: The UDR sends a data delete response to the UDM. Correspondingly, the UDM receives the data delete response.

For specific implementation of this step, refer to step S623 in the embodiment shown in FIG. 8A to FIG. 8C.

S724: The UDM sends a terminal authentication event confirmation delete response to the AUSF. Correspondingly, the AUSF receives the terminal authentication event confirmation delete response.

For specific implementation of this step, refer to step S624 in the embodiment shown in FIG. 8A to FIG. 8C.

S725: The AUSF sends a terminal authentication event delete response to the target AMF. Correspondingly, the target AMF receives the terminal authentication event delete response.

For specific implementation of this step, refer to step S625 in the embodiment shown in FIG. 8A to FIG. 8C.

According to the authentication event processing method provided in this embodiment of this application, when the authentication event in the unified data repository network element needs to be deleted, the unified data repository network element deletes the authentication event associated with the serving network name, so that the unified data repository network element does not delete the authentication event by mistake in a scenario in which the terminal performs dual registration via two different serving networks, or the like. Therefore, the authentication event in the unified data repository network element can be accurately deleted, and a communication exception caused by deleting the authentication event by mistake is prevented. In addition, after detecting that the terminal moves and registers with the target mobility management network element, the source mobility management network element sends the authentication context identifier to the target mobility management network element, so that when the NAS SMC failure or terminal deregistration occurs, the target mobility management network element can initiate an authentication event processing procedure, to improve reliability of authentication event processing. In addition, the authentication context identifier is generated based on the terminal identifier and the serving network name. Therefore, in an interaction procedure between the mobility management network element and the authentication server network element, the serving network name does not need to be carried. This may reduce signaling overheads, simplify a procedure, and prevent mishandling in a dual-authentication scenario.

It may be understood that, in the foregoing embodiments, methods and/or steps implemented by any network element may also be implemented by a component (for example, a chip or a circuit) that can be used in the network element.

The foregoing mainly describes the solutions provided in embodiments of this application from a perspective of interaction between network elements. Correspondingly, an embodiment of this application further provides an apparatus, and the apparatus is configured to implement the foregoing methods. The apparatus may be any network element in the foregoing method embodiment, or an apparatus including any network element, or a component that can be used in any network element. It may be understood that, to implement the foregoing functions, the apparatus includes a hardware structure and/or a software module for performing a corresponding function. A person skilled in the art should easily be aware that, in combination with units and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, the apparatus may be divided into function modules based on the foregoing method embodiments. For example, each function module may be obtained through division based on each corresponding function, or two or more functions may be integrated into one processing module. The integrated module may be implemented in a form of hardware, or may be implemented in a form of a software function module. It should be noted that, in embodiments of this application, module division is merely an example, and is merely a logical function division. In actual implementation, another division manner may be used.

Figures 10, 11:
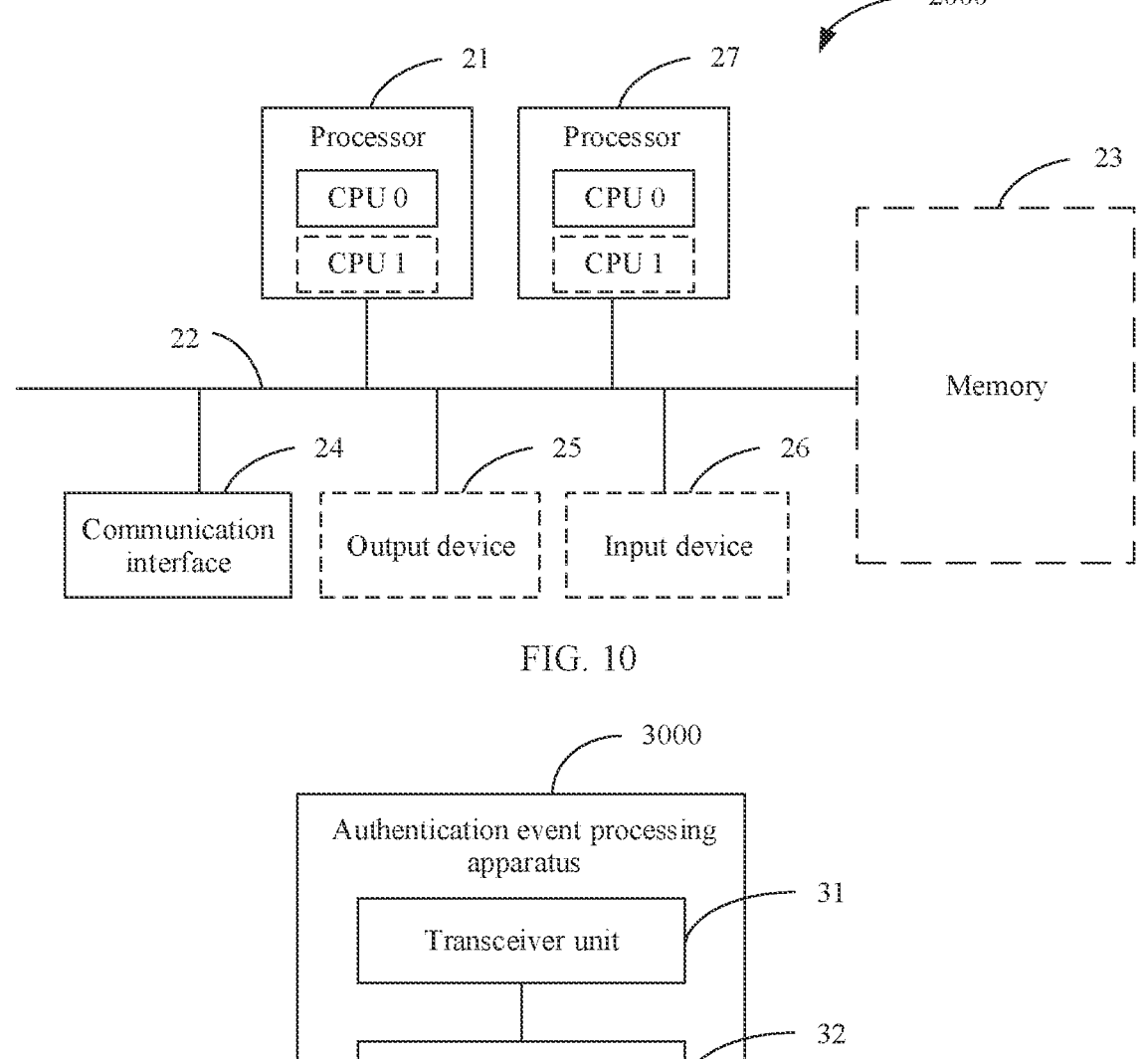
FIG. 10 is a schematic diagram of a structure of an authentication event processing apparatus according to an embodiment of this application.
FIG. 11 is a schematic diagram of another structure of an authentication event processing apparatus according to an embodiment of this application.

The related function of each network element in embodiments of this application may be implemented by an authentication event processing apparatus 2000 in FIG. 10. FIG. 10 is a schematic diagram of a structure of an authentication event processing apparatus 2000 according to an embodiment of this application. The authentication event processing apparatus 2000 includes one or more processors 21, a communication line 22, and at least one communication interface (only an example in which the authentication event processing apparatus 2000 includes a communication interface 24 and one processor 21 is used in FIG. 10 for description). Optionally, the authentication event processing apparatus 2000 may further include a memory 23.

The processor 21 may be a CPU, a microprocessor, an application-specific integrated circuit (application-specific integrated circuit, ASIC), or one or more integrated circuits configured to control program execution of the solution of this application.

The communication line 22 may include a path, to connect different components.

The communication interface 24 may be a transceiver module configured to communicate with another device or a communication network, for example, the Ethernet, a RAN, or a wireless local area network (wireless local area network, WLAN). For example, the transceiver module may be an apparatus such as a transceiver or a transceiver machine. Optionally, the communication interface 24 may alternatively be a transceiver circuit located in the processor 21, and is configured to implement signal input and signal output of the processor.

The memory 23 may be an apparatus having a storage function. For example, the memory 23 may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another optical disc storage, an optical disc storage (including a compact optical disc, a laser disc, an optical disc, a digital versatile optical disc, a Blu-ray disc, and the like), a magnetic disk storage medium or another magnetic storage device, or any other medium that can be used to carry or store expected program code in a form of an instruction or a data structure and that can be accessed by a computer. However, this is not limited herein. The memory may exist independently and is connected to the processor through the communication line 22. The memory may alternatively be integrated with the processor.

The memory 23 is configured to store computer-executable instructions for executing the solutions in this application, and the processor 21 controls the execution. The processor 21 is configured to execute the computer-executable instructions stored in the memory 23, to implement the authentication event processing method provided in embodiments of this application.

Alternatively, in this embodiment of this application, the processor 21 may perform processing related functions in the authentication event processing method provided in the following embodiment in this application, and the communication interface 24 is responsible for communication with another device or a communication network. This is not specifically limited in this embodiment of this application.

The computer-executable instructions in this embodiment of this application may also be referred to as application program code. This is not specifically limited in this embodiment of this application.

During specific implementation, in an embodiment, the processor 21 may include one or more CPUs, for example, a CPU 0 and a CPU 1 in FIG. 10.

During specific implementation, in an embodiment, the authentication event processing apparatus 2000 may include a plurality of processors, for example, the processor 21 and a processor 27 in FIG. 10. Each of the processors may be a single-core (single-CPU) processor or a multi-core (multi-CPU) processor. The processors herein may be one or more devices, circuits, and/or processing cores for processing data (for example, computer program instructions).

During specific implementation, in an embodiment, the authentication event processing apparatus 2000 may further include an output device 25 and an input device 26. The output device 25 communicates with the processor 21, and may display information in a plurality of manners.

The authentication event processing apparatus 2000 may be a general-purpose apparatus or a dedicated apparatus. For example, the authentication event processing apparatus 2000 may be a desktop computer, a portable computer, a network server, a personal digital assistant (personal digital assistant, PDA), a mobile phone, a tablet computer, a wireless terminal device, an embedded device, or a device having a structure similar to that in FIG. 10. A type of the authentication event processing apparatus 2000 is not limited in this embodiment of this application.

FIG. 11 is a schematic diagram of a structure of another authentication event processing apparatus. The authentication event processing apparatus 3000 includes a transceiver unit 31 and a processing unit 32. The transceiver unit 31 may also be referred to as a transceiver module, and is configured to implement a transceiver function. For example, the transceiver unit 31 may be a transceiver circuit, a transceiver machine, a transceiver, or a communication interface.

The transceiver unit 31 is configured to receive a third authentication event processing request from a unified data management network element, where the third authentication event processing request includes third information, and the third information includes one or more of the following information: a terminal identifier, a serving network name, a second authentication event identifier; and the processing unit 32 is configured to query an authentication event corresponding to the third information. The processing unit 32 is further configured to process the authentication event; and the transceiver unit 31 is further configured to send a third authentication event processing response to the unified data management network element.

Optionally, the processing unit 32 is configured to perform any one of the following operations: deleting the authentication event; identifying the authentication event as invalid; updating the authentication event to failed.

Optionally, the transceiver unit 31 is further configured to receive an authentication event repository request from the unified data management network element, where the authentication event repository request includes fourth information, and the fourth information includes one or more of the following information: the terminal identifier, the serving network name, the authentication event: the processing unit 32 is further configured to correspondingly store the one or more of the information in the fourth information; and the transceiver unit 31 is further configured to send an authentication event repository response to the unified data management network element.

Optionally, the processing unit 32 is further configured to generate the second authentication event identifier based on the terminal identifier and/or the serving network name; and the processing unit 32 is further configured to correspondingly store the second authentication event identifier and the authentication event, where the authentication event repository response includes the second authentication event identifier.

For specific implementations of the transceiver unit 31 and the processing unit 32, refer to related descriptions of the UDR in FIG. 7 to FIG. 9A to FIG. 9C.

According to the authentication event processing apparatus provided in this embodiment of this application, when the authentication event in the unified data repository network element needs to be deleted, the unified data repository network element deletes the authentication event associated with the serving network name, so that the unified data repository network element does not delete the authentication event by mistake in a scenario in which a terminal performs dual registration via two different serving networks, or the like. Therefore, the authentication event in the unified data repository network element can be accurately deleted, and a communication exception caused by deleting the authentication event by mistake is prevented.

Figure 12:
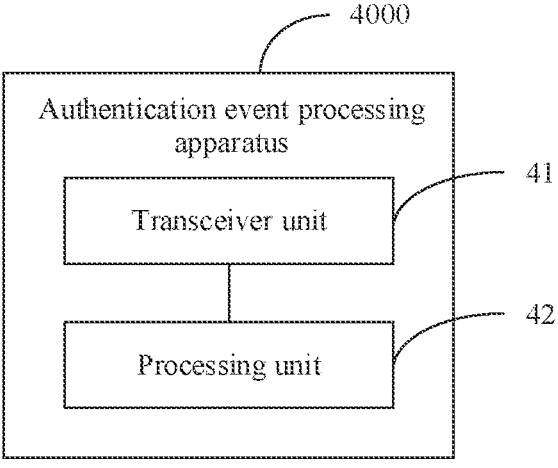
FIG. 12 is a schematic diagram of another structure of an authentication event processing apparatus according to an embodiment of this application.

FIG. 12 is a schematic diagram of a structure of another authentication event processing apparatus. The authentication event processing apparatus 4000 includes a transceiver unit 41 and a processing unit 42. The transceiver unit 41 may also be referred to as a transceiver module, and is configured to implement a transceiver function. For example, the transceiver unit 41 may be a transceiver circuit, a transceiver machine, a transceiver, or a communication interface.

The transceiver unit 41 is configured to receive a second authentication event processing request from an authentication server network element, where the second authentication event processing request includes second information, and the second information includes one or more of the following information: a terminal identifier, a serving network name, a first authentication event identifier; and the processing unit 42 is configured to query an authentication event corresponding to the second information. The processing unit 42 is further configured to process the authentication event, the transceiver unit 41 is further configured to send a third authentication event processing request to a unified data repository network element, where the third authentication event processing request includes third information, and the third information includes one or more of the following information: the terminal identifier, the serving network name, a second authentication event identifier; the transceiver unit 41 is further configured to receive a third authentication event processing response from the unified data repository network element; and the transceiver unit 41 is further configured to send a second authentication event processing response to the authentication server network element.

Optionally, the processing unit 42 is configured to perform any one of the following operations: deleting the authentication event; identifying the authentication event as invalid; updating the authentication event to failed.

Optionally, the transceiver unit 41 is further configured to send an authentication event repository request to the unified data repository network element, where the authentication event repository request includes fourth information, and the fourth information includes one or more of the following information: the terminal identifier, the serving network name, the authentication event; and the transceiver unit 41 is further configured to receive an authentication event repository response from the unified data repository network element.

Optionally, the authentication event repository response includes the first authentication event identifier.

Optionally, the transceiver unit 41 is further configured to receive an authentication result confirmation request from the authentication server network element, where the authentication result confirmation request includes the terminal identifier and/or the authentication event, and the authentication event includes the serving network name: the processing unit 42 is further configured to generate the first authentication event identifier based on the terminal identifier and/or the serving network name; and the transceiver unit 41 is further configured to send an authentication result confirmation response to the authentication server network element, where the authentication result confirmation response includes the first authentication event identifier.

For specific implementations of the transceiver unit 41 and the processing unit 42, refer to related descriptions of the UDM in FIG. 7 to FIG. 9A to FIG. 9C.

According to the authentication event processing apparatus provided in this embodiment of this application, after receiving the second authentication event processing request from the authentication server network element, the authentication event processing apparatus may request, based on the third information, the unified data repository network element to process the authentication event stored in the unified data repository network element, where the third information includes the serving network name. In this way, the unified data repository network element deletes the authentication event associated with the serving network name, so that the unified data repository network element does not delete the authentication event by mistake in a scenario in which a terminal performs dual registration via two different serving networks, or the like. Therefore, the authentication event in the unified data repository network element can be accurately deleted, and a communication exception caused by deleting the authentication event by mistake is prevented.

Figure 13:
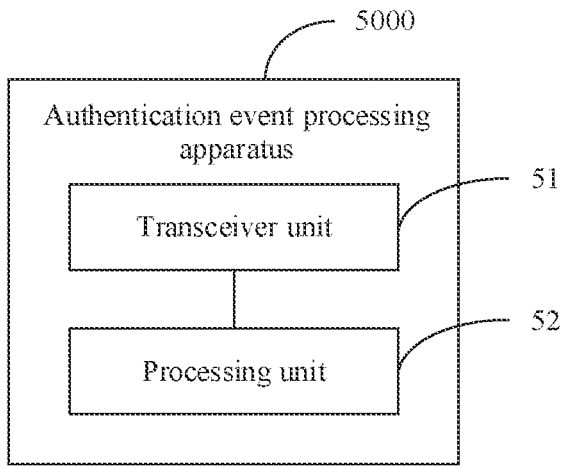
FIG. 13 is a schematic diagram of another structure of an authentication event processing apparatus according to an embodiment of this application.

FIG. 13 is a schematic diagram of a structure of another authentication event processing apparatus. The authentication event processing apparatus 5000 includes a transceiver unit 51 and a processing unit 52. The transceiver unit 51 may also be referred to as a transceiver module, and is configured to implement a transceiver function. For example, the transceiver unit 51 may be a transceiver circuit, a transceiver machine, a transceiver, or a communication interface.

The transceiver unit 51 is configured to receive a first authentication event processing request from a mobility management network element, where the first authentication event processing request includes first information, and the first information includes one or more of the following information: a terminal identifier, a serving network name, an authentication context identifier; and the processing unit 52 is configured to query a corresponding first authentication event identifier based on the first information. The transceiver unit 51 is further configured to send a second authentication event processing request to a unified data management network element, where the second authentication event processing request includes second information, and the second information includes one or more of the following information: the terminal identifier, the serving network name, the first authentication event identifier; the transceiver unit 51 is further configured to receive a second authentication event processing response from the unified data management network element; and the transceiver unit 51 is further configured to send a first authentication event processing response to the mobility management network element.

Optionally, the transceiver unit 51 is further configured to send an authentication result confirmation request to the unified data management network element, where the authentication result confirmation request includes the terminal identifier and/or an authentication event, and the authentication event includes the serving network name; and the transceiver unit 51 is further configured to receive an authentication result confirmation response from the unified data management network element, where the authentication result confirmation response includes the first authentication event identifier.

Optionally, the processing unit 52 is further configured to generate an authentication context identifier based on the terminal identifier and/or the serving network name; and the transceiver unit 51 is further configured to send the authentication context identifier to the mobility management network element.

For specific implementations of the transceiver unit 51 and the processing unit 52, refer to related descriptions of the AUSF in FIG. 7 to FIG. 9A to FIG. 9C.

According to the authentication event processing apparatus provided in this embodiment of this application, when a non-access stratum security mode command failure, terminal deregistration, or the like occurs on a terminal, the authentication event processing apparatus may receive the authentication event processing request of the mobility management network element in time, and notify, in time, the unified data management network element to process the authentication event.

Figure 14:
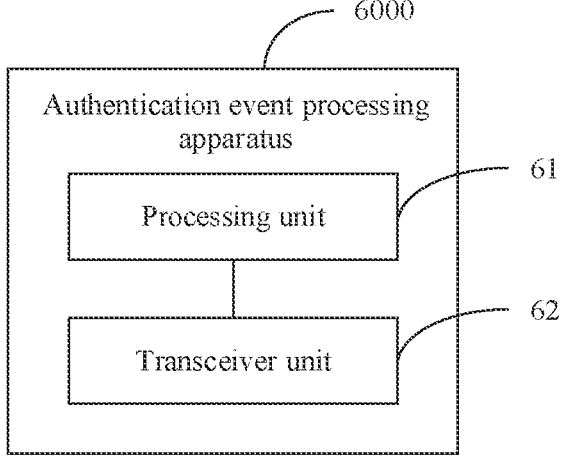
FIG. 14 is a schematic diagram of another structure of an authentication event processing apparatus according to an embodiment of this application.

FIG. 14 is a schematic diagram of a structure of another authentication event processing apparatus. The authentication event processing apparatus 6000 includes a processing unit 61 and a transceiver unit 62. The transceiver unit 62 may also be referred to as a transceiver module, and is configured to implement a transceiver function. For example, the transceiver unit 62 may be a transceiver circuit, a transceiver machine, a transceiver, or a communication interface.

The processing unit 61 is configured to detect that a terminal moves and registers with a target mobility management network element; and the transceiver unit 62 is configured to send a context communication service request to the target mobility management network element, where the context communication service request includes an authentication context identifier. The transceiver unit 62 is further configured to receive a context communication service response from the target mobility management network element.

Optionally, the transceiver unit 62 is further configured to receive the authentication context identifier from an authentication server network element.

For specific implementations of the processing unit 61 and the transceiver unit 62, refer to related descriptions of the source AMF in FIG. 7 to FIG. 9A to FIG. 9C.

According to the authentication event processing apparatus provided in this embodiment of this application, after detecting that the terminal moves and registers with the target mobility management network element, the authentication event processing apparatus may send the authentication context identifier to the target mobility management network element, so that after terminal deregistration or a non-access stratum security mode command failure occurs, the target mobility management network element can trigger, in time, the authentication server network element to process an authentication event.

Figure 15:
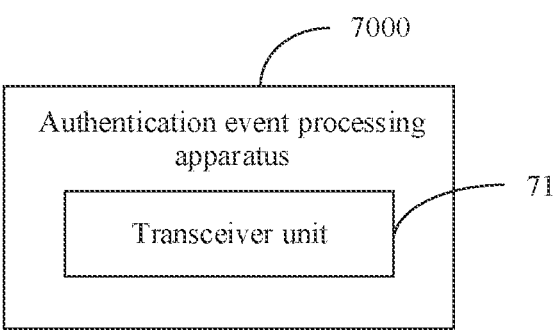
FIG. 15 is a schematic diagram of another structure of an authentication event processing apparatus according to an embodiment of this application.

FIG. 15 is a schematic diagram of a structure of another authentication event processing apparatus. The authentication event processing apparatus 7000 includes a transceiver unit 71. The transceiver unit 71 may also be referred to as a transceiver module, and is configured to implement a transceiver function. For example, the transceiver unit 71 may be a transceiver circuit, a transceiver machine, a transceiver, or a communication interface.

The transceiver unit 71 is configured to receive a context communication service request from a source mobility management network element, where the context communication service request includes an authentication context identifier. The transceiver unit 71 is further configured to send a context communication service response to the source mobility management network element; the transceiver unit 71 is further configured to send a first authentication event processing request to an authentication server network element, where the first authentication event processing request includes first information, and the first information includes one or more of the following information: a terminal identifier, a serving network name, the authentication context identifier; and the transceiver unit 71 is further configured to receive a first authentication event processing response from the authentication server network element.

For a specific implementation of the transceiver unit 71, refer to related descriptions of the target AMF in FIG. 7 to FIG. 9A to FIG. 9C.

According to the authentication event processing apparatus provided in this embodiment of this application, after the source mobility management network element detects that a terminal moves and registers with the authentication event processing apparatus, the authentication event processing apparatus receives the authentication context identifier sent by the source mobility management network element, so that after terminal deregistration or a non-access stratum security mode command failure occurs, the authentication server network element can be triggered, in time, to process an authentication event.

Optionally, an embodiment of this application further provides a chip system, including at least one processor and an interface. The at least one processor is coupled to a memory through the interface. When the at least one processor executes a computer program or instructions in the memory, the method in any one of the foregoing method embodiments is performed. Optionally, the chip system may include a chip, or may include a chip and another discrete component. This is not specifically limited in this embodiment of this application.

It should be understood that unless otherwise specified, "/" in descriptions of this application represents an "or" relationship between associated objects. For example, A/B may represent A or B. A and B may be singular or plural. In addition, unless otherwise specified, "a plurality of" in the descriptions of this application means two or more than two. "At least one item (piece) of the following" or a similar expression thereof means any combination of the items, including any combination of singular items (pieces) or plural items (pieces). For example, at least one item (piece) of a, b, or c may indicate: a, b, c, a and b, a and c, b and c, or a, b, and c, where a, b, and c may be singular or plural. In addition, for convenience of clear description of the technical solutions in embodiments of this application, in embodiments of this application, terms such as "first" and "second" are used to distinguish between same objects or similar objects whose functions and purposes are basically the same. A person skilled in the art may understand that the terms such as "first" and "second" do not constitute a limitation on a quantity or an execution sequence, and that the terms such as "first" and "second" do not indicate a definite difference. In addition, in embodiments of this application, the word such as "example" or "for example" is used to represent giving an example, an illustration, or a description. Any embodiment or design scheme described as an "example" or "for example" in embodiments in this application should not be explained as being more preferable or having more advantages than another embodiment or design scheme. Exactly, use of the word such as "example" or "for example" is intended to present a relative concept in a specific manner for ease of understanding.

All or some of the foregoing embodiments may be implemented by software, hardware, firmware, or any combination thereof. When a software program is used to implement embodiments, embodiments may be implemented completely or partially in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (digital versatile disc. DVD)), a semiconductor medium (for example, a solid-state drive (solid-state drive, SSD)), or the like.

Although this application is described with reference to embodiments, in a process of implementing this application that claims protection, a person skilled in the art may understand and implement another variation of the disclosed embodiments by viewing the appended drawings, disclosed content, and the appended claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example descriptions of this application defined by the appended claims, and are considered as any of or all modifications, variations, combinations or equivalents that cover the scope of this application. It is clear that, a person skilled in the art can make various modifications and variations to this application without departing from the spirit and scope of this application. This application is intended to cover the modifications and variations of this application provided that they fall within the scope of the following claims and equivalent technologies of this application.

What is claimed is:

1. An authentication event processing method, comprising:

receiving by a unified data management network element, an authentication result confirmation request from an authentication server network element, wherein the authentication result confirmation request comprises a terminal identifier and an authentication event, and the authentication event comprises a serving network name;

storing, by the unified data management network element, the authentication event as an authentication status;

sending, by the unified data management network element, an authentication result confirmation response to the authentication server network element;

receiving, by the unified data management network element, a terminal authentication event confirmation delete request from the authentication server network element, the terminal authentication event confirmation delete request requesting to delete the authentication event, wherein the terminal authentication event confirmation delete request comprises the terminal identifier and the serving network name;

deleting, by the unified data management network element, the authentication event corresponding to the terminal identifier and the serving network name; and sending, by the unified data management network element, a terminal authentication event confirmation delete response to the authentication server network element.

2. The method according to claim 1, wherein the method further comprises:

sending, by the unified data management network element, an authentication event repository request to a unified data repository network element, wherein the authentication event repository request comprises the terminal identifier and the serving network name; and receiving, by the unified data management network element, an authentication event repository response from the unified data repository network element.

3. The method according to claim 2, wherein the authentication event repository response comprises a first authentication event identifier of the authentication event.

4. The method according to claim 1, wherein the method further comprises:

querying, by the unified data management network element, the authentication event corresponding to the terminal identifier and the serving network name, after receiving the terminal authentication event confirmation delete request.

5. The method according to claim 1, wherein the method further comprises:

sending, by the unified data management network element, a data delete request to a unified data repository network element, wherein the data delete request comprises the terminal identifier and the serving network name; and receiving, by the unified data management network element, a data delete response from the unified data repository network element.

6. An authentication event processing method, comprising:

sending, by an authentication server network element, an authentication result confirmation request to a unified data management network element, wherein the authentication result confirmation request comprises a terminal identifier and an authentication event, and the authentication event comprises a serving network name;

receiving, by the unified data management network element, the authentication result confirmation request;

storing, by the unified data management network element, the authentication event as an authentication status;

sending, by the unified data management network element, an authentication result confirmation response to the authentication server network element;

receiving, by the authentication server network element, the authentication result confirmation response;

sending, by the authentication server network element, a terminal authentication event confirmation delete request to the unified data management network element, the terminal authentication event confirmation delete request requesting to delete the authentication event, wherein the terminal authentication event confirmation delete request comprises the terminal identifier and the serving network name;

deleting, by the unified data management network element, the authentication event corresponding to the terminal identifier and the serving network name;

sending, by the unified data management network element, a terminal authentication event confirmation delete processing response to the authentication server network element; and receiving, by the authentication server network element, the terminal authentication event confirmation delete response.

7. The method according to claim 5, wherein the method further comprises:

detecting, by a source mobility management network element, that a terminal moves and registers with a target mobility management network element;

sending, by the source mobility management network element, a context communication service request to the target mobility management network element, wherein the context communication service request comprises an authentication context identifier; and sending, by the target mobility management network element, a context communication service response to the source mobility management network element.

8. The method according to claim 5, wherein the method further comprises:

generating, by the authentication server network element, an authentication context identifier based on at least one of the terminal identifier or the serving network name; and sending, by the authentication server network element, the authentication context identifier to a mobility management network element.

9. The method according to claim 6, wherein the method further comprises:

sending, by the unified data management network element, an authentication event repository request to a unified data repository network element, wherein the authentication event repository request comprises the terminal identifier and the serving network name, or the authentication event repository request comprises the terminal identifier and a first authentication event;

saving, by the unified data repository network element, a correspondence between the terminal identifier and the serving network name or a correspondence between the terminal identifier and the first authentication event; and receiving, by the unified data management network element, an authentication event repository response from the unified data repository network element.

10. The method according to claim 6, wherein the method further comprises:

sending, by the unified data management network element, a data delete request to a unified data repository network element, wherein the data delete request comprises the terminal identifier and the serving network name;

deleting, by the unified data repository network element, the authentication event corresponding to the terminal identifier and the serving network name;

sending, by the unified data repository network element, a data delete response to the unified data management network element; and receiving, by the unified data management network element, the data delete response.

11. An authentication event processing apparatus, comprising:

a transceiver;

at least one processor; and one or more memories coupled to the at least one processor and storing programming instructions for execution by the at least one processor to:

receive, by the transceiver, an authentication result confirmation request from an authentication server network element, wherein the authentication result confirmation request comprises a terminal identifier and an authentication event, and the authentication event comprises a serving network name;

store, by the at least one processor, the authentication event as an authentication status;

send, by the transceiver, an authentication result confirmation response to the authentication server network element;

receive, by the transceiver, a terminal authentication event confirmation delete request from the authentication server network element, the terminal authentication event confirmation delete request requesting to delete the authentication event, wherein the terminal authentication event confirmation delete request comprises the terminal identifier and the serving network name;

delete, by the at least one processor, the authentication event corresponding to the terminal identifier and the serving network name; and send, by the transceiver, a terminal authentication event confirmation delete response to the authentication server network element.

12. The apparatus according to claim 11, the programming instructions are for execution by the at least one processor to:

send, by the transceiver, an authentication event repository request to a unified data repository network element, wherein the authentication event repository request comprises the terminal identifier and the serving network name; and receive, by the transceiver, an authentication event repository response from the unified data repository network element.

13. The apparatus according to claim 12, wherein the authentication event repository response comprises a first authentication event identifier of the authentication event.

14. The apparatus according to claim 11, the programming instructions are for execution by the at least one processor to:

send, by the transceiver, a data delete request to a unified data repository network element, wherein the data delete request comprises the terminal identifier and the serving network name; and receive, by the transceiver, a data delete response from the unified data repository network element.

15. An authentication event processing system, comprising:

an authentication server network element, configured to send an authentication result confirmation request to a unified data management network element, wherein the authentication result confirmation request comprises a terminal identifier and an authentication event, and the authentication event comprises a serving network name:

the unified data management network element, configured to:

receive the authentication result confirmation request;

store the authentication event as an authentication status; and send an authentication result confirmation response to the authentication server network element;

the authentication server network element is further configured to send a terminal authentication event confirmation delete request to the unified data management network element, the terminal authentication event confirmation delete request requesting to delete the authentication event, wherein the terminal authentication event confirmation delete request comprises the terminal identifier and the serving network name;

the unified data management network element is further configured to delete the authentication event corresponding to the terminal identifier and the serving network name;

the unified data management network element is further configured to send a terminal authentication event confirmation delete response to the authentication server network element; and the authentication server network element is further configured to receive the terminal authentication event confirmation delete response.

16. The system according to claim 15, wherein the system further comprises:

a source mobility management network element, configured to detect that a terminal moves and registers with a target mobility management network element, wherein the source mobility management network element is further configured to send a context communication service request to the target mobility management network element, wherein the context communication service request comprises an authentication context identifier; and the target mobility management network element, configured to send a context communication service response to the source mobility management network element.

17. The system according to claim 15, wherein:

the authentication server network element is further configured to generate an authentication context identifier based on at least one of the terminal identifier or the serving network name; and the authentication server network element is further configured to send the authentication context identifier to a mobility management network element.

18. The system according to claim 15, wherein:

the unified data management network element is further configured to send an authentication event repository request to a unified data repository network element, wherein the authentication event repository request comprises fourth information, and the fourth information comprises one or more information comprising at least one of: the terminal identifier, the serving network name, or a second authentication event;

the system further comprises the unified data repository network element configured to store the one or more information in the fourth information; and the unified data repository network element is further configured to send an authentication event repository response to the unified data management network element.

19. The system according to claim 18, wherein:

the unified data repository network element is further configured to generate a second authentication event identifier based on at least one of the terminal identifier or the serving network name; and the unified data repository network element is further configured to store the second authentication event identifier and the second authentication event, wherein the authentication event repository response comprises the second authentication event identifier.

20. The system according to claim 15, wherein the unified data management network element is further configured to send a data delete request to a unified data repository network element, wherein the data delete request comprises the terminal identifier and the serving network name;

the system further comprises the unified data repository network element configured to delete the authentication event corresponding to the terminal identifier and the serving network name; and send a data delete response to the unified data management network element; and the unified data management network element is further configured to receive the data delete response.

\* \* \* \* \*